(12) United States Patent
Tomoda

(10) Patent No.: US 12,137,107 B2
(45) Date of Patent: Nov. 5, 2024

(54) FRAUD DETECTION SYSTEM, FRAUD DETECTION METHOD, AND PROGRAM

(71) Applicant: RAKUTEN GROUP, INC., Tokyo (JP)

(72) Inventor: Kyosuke Tomoda, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 17/908,231

(22) PCT Filed: Aug. 31, 2021

(86) PCT No.: PCT/JP2021/031998
§ 371 (c)(1),
(2) Date: Aug. 30, 2022

(87) PCT Pub. No.: WO2023/032044
PCT Pub. Date: Mar. 9, 2023

(65) Prior Publication Data
US 2024/0223575 A1  Jul. 4, 2024

(51) Int. Cl.
*H04L 29/06* (2006.01)
*G06F 21/55* (2013.01)
(Continued)

(52) U.S. Cl.
CPC ........ *H04L 63/1416* (2013.01); *G06F 21/554* (2013.01); *G06F 21/56* (2013.01);
(Continued)

(58) Field of Classification Search
None
See application file for complete search history.

(56) References Cited

U.S. PATENT DOCUMENTS 11,132,425 B1    9/2021  Cohen et al.
11,179,639 B1 *  11/2021  Aghdaie ................. A63F 13/75
(Continued)

FOREIGN PATENT DOCUMENTS

AU    2021203921 A1 *  1/2022  ......... G06K 9/00449
CN    109257321 A     1/2019
(Continued)

OTHER PUBLICATIONS

Office Action of Apr. 30, 2024, for related U.S. Appl. No. 17/908,234, pp. 1-25.
(Continued)

*Primary Examiner* — Andrew J Steinle
(74) *Attorney, Agent, or Firm* — HEA LAW PLLC

(57) ABSTRACT

A fraud detection system, comprising at least one processor configured to: acquire, based on a first fraud detection engine for detecting a fraud in a first service, a second fraud detection engine for detecting a fraud in a second service; acquire fraud information relating to a fraud that has actually occurred in the second service; determine, based on the fraud information, whether a fraud in the second service is detectable by the second fraud detection engine; and apply, when it is determined that a fraud in the second service is detectable by the second fraud detection engine, the second fraud detection engine to the second service.

15 Claims, 16 Drawing Sheets

(51) Int. Cl.
    *G06F 21/56* (2013.01)
    *G06N 20/00* (2019.01)
    *H04L 9/40* (2022.01)
    *H04W 12/12* (2021.01)

(52) U.S. Cl.
    CPC ........... *G06N 20/00* (2019.01); *H04L 63/205* (2013.01); *H04W 12/12* (2013.01)

(56) References Cited

U.S. PATENT DOCUMENTS

| | | |
|---|---|---|
| 2017/0264619 A1 | 9/2017 | Narayanaswamy et al. |
| 2017/0264640 A1 | 9/2017 | Narayanaswamy et al. |
| 2018/0367575 A1 | 12/2018 | Narayanaswamy et al. |
| 2019/0268379 A1 | 8/2019 | Narayanaswamy et al. |
| 2019/0268381 A1 | 8/2019 | Narayanaswamy et al. |
| 2019/0327272 A1 | 10/2019 | Narayanaswamy |
| 2019/0392140 A1 | 12/2019 | Kawakita |
| 2020/0074106 A1 | 3/2020 | Narayanaswamy et al. |
| 2020/0145463 A1 | 5/2020 | Narayanaswamy et al. |
| 2020/0177637 A1 | 6/2020 | Narayanaswamy et al. |
| 2021/0226998 A1 | 7/2021 | Narayanaswamy et al. |
| 2021/0264299 A1 | 8/2021 | Tomoda |
| 2021/0350262 A1* | 11/2021 | Song ................ G06Q 20/4016 |
| 2022/0027915 A1 | 1/2022 | Cameron et al. |
| 2023/0059064 A1 | 2/2023 | Benkreira et al. |

FOREIGN PATENT DOCUMENTS

| | | |
|---|---|---|
| JP | 2019009728 A | 1/2019 |
| JP | 2019153330 A | 9/2019 |
| JP | 2020091814 A | 6/2020 |
| JP | 2021081980 A | 5/2021 |
| WO | 2018139458 A1 | 8/2018 |
| WO | 2020261426 A1 | 12/2020 |

OTHER PUBLICATIONS

Office Action of May 30, 2023, for related TW Patent Application No. 111132894, and partial English translation, pp. 1-23.
International Search Report of Nov. 16, 2021, for International Patent Application PCT/JP2021/031999 pp. 1-8.
Office Action of Aug. 30, 2024, for corresponding U.S. Appl. No. 17/908,234, pp. 1-20.

* cited by examiner

FIG.3

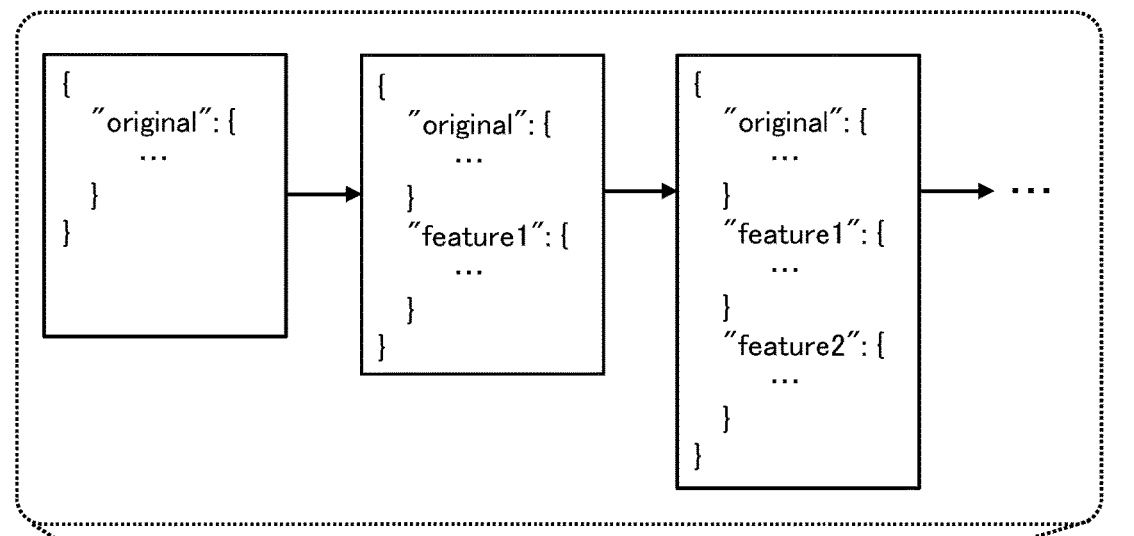

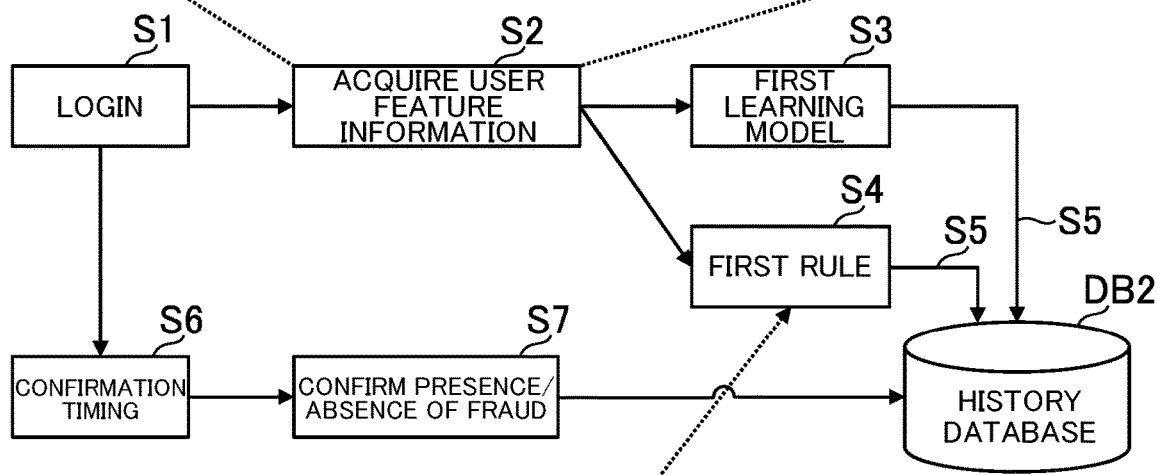

FIRST RULE 1-1: DETERMINE THAT THERE IS FRAUD WHEN "feature1" (DISTANCE FROM CENTRAL PLACE OF USE) IS LESS THAN 50

FIRST RULE 1-2: DETERMINE THAT THERE IS FRAUD WHEN "feature2" (USAGE COUNT IN CURRENT TIME PERIOD) IS LESS THAN 2 AND "feature3" (NORMAL DEVICE ID) IS DIFFERENT FROM "deviceid"

FIRST RULE 1-3: DETERMINE THAT THERE IS FRAUD WHEN "posts" (NUMBER OF POSTS) IS 500 OR MORE, "followers" (NUMBER OF FOLLOWERS) IS 1,000 OR MORE, AND "feature4" (USAGE COUNT OF "ipaddress") IS LESS THAN 2

FIG.5

| USER ID | PASSWORD | USER INFORMATION | USER INFORMATION | USAGE HISTORY INFORMATION |
|---|---|---|---|---|
| taro.yamada123 | ******* | USER INFORMATION1-1 | USER INFORMATION 1-1 | USAGE HISTORY INFORMATION1-1 |
| hanako.kimura999 | ****** | USER INFORMATION1-2 | USER INFORMATION 1-2 | USAGE HISTORY INFORMATION1-2 |
| hideo.tanaka001 | ******** | USER INFORMATION1-3 | USER INFORMATION 1-3 | USAGE HISTORY INFORMATION1-3 |
| ... | ... | ... | ... | ... |

| USER FEATURE INFORMATION | RESULT INFORMATION | STATUS INFORMATION |
|---|---|---|
| USER FEATURE INFORMATION 1-1 | VALID | CONFIRMED |
| USER FEATURE INFORMATION 1-2 | FRAUD | CONFIRMED |
| USER FEATURE INFORMATION 1-3 | VALID | NOT YET CONFIRMED |
| . . . | . . . | . . . |

FIG.7

| USER ID | PASSWORD | USER INFORMATION | USER INFORMATION | USAGE HISTORY INFORMATION |
|---|---|---|---|---|
| jiro.hakamada01 | ****** | USER INFORMATION2-1 | USER INFORMATION 2-1 | USAGE HISTORY INFORMATION2-1 |
| humiko.ichikawa | ****** | USER INFORMATION2-2 | USER INFORMATION 2-2 | USAGE HISTORY INFORMATION2-2 |
| aki.yamaoka | ******** | USER INFORMATION2-3 | USER INFORMATION 2-3 | USAGE HISTORY INFORMATION2-3 |
| . | . | . | . | . |
| . | . | . | . | . |
| . | . | . | . | . |

| FRAUD INFORMATION | DB4 |
|---|---|
| USER FEATURE INFORMATION | RESULT INFORMATION |
| USER FEATURE INFORMATION 1-1 | FRAUD |
| USER FEATURE INFORMATION 1-2 | FRAUD |
| USER FEATURE INFORMATION 1-3 | FRAUD |
| ⋮ | ⋮ |

FIG.9

FIRST RULES

FIRST RULE 1-1: DETERMINE THAT THERE IS FRAUD WHEN "feature1" (DISTANCE FROM CENTRAL PLACE OF USE) IS LESS THAN 50

FIRST RULE 1-2: DETERMINE THAT THERE IS FRAUD WHEN "feature2" (USAGE COUNT IN CURRENT TIME PERIOD) IS LESS THAN 2 AND "feature3" (NORMAL DEVICE ID) IS DIFFERENT FROM "deviceid"

FIRST RULE 1-3: DETERMINE THAT THERE IS FRAUD WHEN "posts" (NUMBER OF POSTS) IS 500 OR MORE, "followers" (NUMBER OF FOLLOWERS) IS 1,000 OR MORE, AND "feature4" (USAGE COUNT OF "ipaddress") IS LESS THAN 2

⋮

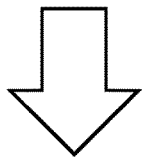

CREATE SECOND RULE OF SECOND FRAUD DETECTION ENGINE BY CUSTOMIZING FIRST RULES INCLUDED IN FIRST FRAUD DETECTION ENGINE TO SUIT SECOND SERVICE

SECOND RULES

SECOND RULE 2-1: DETERMINE THAT THERE IS FRAUD WHEN "distance" (DISTANCE FROM CENTRAL PLACE OF USE) IS LESS THAN 100

FIRST RULE 2-2: DETERMINE THAT THERE IS FRAUD WHEN "featureA" (USAGE COUNT IN CURRENT TIME PERIOD) IS LESS THAN 2 AND "feature" (NORMAL DEVICE ID) IS DIFFERENT FROM "terminalid"

SECOND RULE 2-3: DETERMINE THAT THERE IS FRAUD WHEN "messages" (NUMBER OF POSTS) IS 300 OR MORE, "followers" (NUMBER OF FOLLOWERS) IS 500 OR MORE, AND "feature4" (USAGE COUNT OF "ipaddress") IS LESS THAN 2

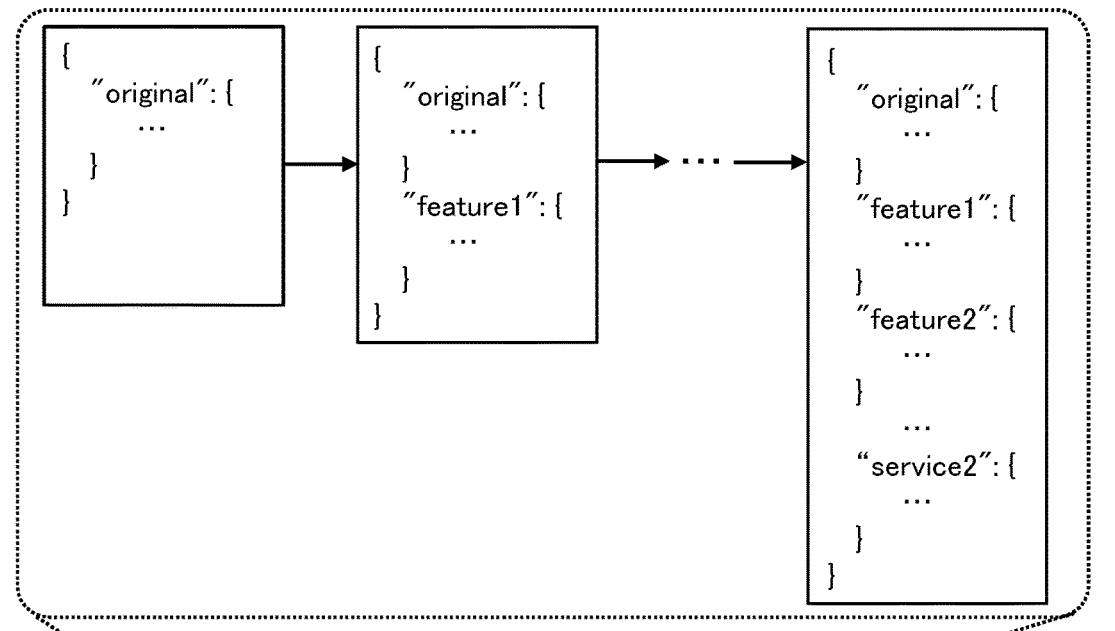

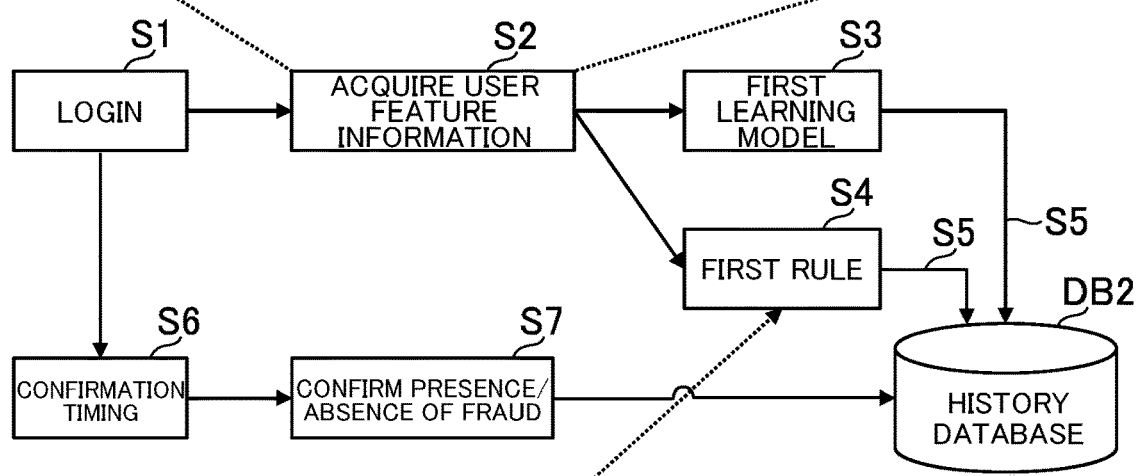

FIRST RULE 1-1: DETERMINE THAT THERE IS FRAUD WHEN "feature1" (DISTANCE FROM CENTRAL PLACE OF USE) IS LESS THAN 50

FIRST RULE 1-2: DETERMINE THAT THERE IS FRAUD WHEN "feature2" (USAGE COUNT IN CURRENT TIME PERIOD) IS LESS THAN 2 AND "feature3" (NORMAL DEVICE ID) IS DIFFERENT FROM "deviceid"

FIRST RULE 1-3: DETERMINE THAT THERE IS FRAUD WHEN "posts" (NUMBER OF POSTS) IS 500 OR MORE, "followers" (NUMBER OF FOLLOWERS) IS 1,000 OR MORE, AND "feature4" (USAGE COUNT OF "ipaddress") IS LESS THAN 2

．
．
．

FIRST RULE 1-15: DETERMINE THAT THERE IS FRAUD WHEN "service2" (RESULT INFORMATION OF SECOND SERVICE) OF USER HAVING "userid" (FIRST USER ID) IS FRAUD

| USER FEATURE INFORMATION | RESULT INFORMATION | STATUS INFORMATION |
|---|---|---|
| USER FEATURE INFORMATION 2-1 | VALID | CONFIRMED |
| USER FEATURE INFORMATION 2-2 | FRAUD | CONFIRMED |
| USER FEATURE INFORMATION 2-3 | VALID | NOT YET CONFIRMED |
| . | . | . |
| . | . | . |
| . | . | . |

FRAUD DETECTION SYSTEM, FRAUD DETECTION METHOD, AND PROGRAM

CROSS REFERENCE TO RELATED APPLICATIONS

This application is a National Stage of International Application No. PCT/JP2021/031998 filed on Aug. 31, 2021. The contents of the above document is incorporated herein by reference in its entirety.

TECHNICAL FIELD

The present disclosure relates to a fraud detection system, a fraud detection method, and a program.

BACKGROUND ART

Hitherto, there has been known a fraud detection system for detecting a fraud in a service. In Patent Literature 1, there is described a technology for training a supervised learning model based on training data having a JSON format, which is a type of domain-specific language. In Patent Literature 2, there is described a technology which uses a tree structure having a JSON format as a data structure of a learning model. In Patent Literature 3, there is described a technology for training a learning model by using a privacy policy having a JSON format as training data.

In Patent Literature 4, there is described a technology in which a trained learning model analyzes metadata having a structured data format, for example, a JSON format, in order to prevent cloud data from being fraudulently acquired. In Patent Literature 5, there is described a technology for verifying the validity of a request from an IoT device written in structured data, for example, a JSON format, in order to ensure the validity of the IoT device.

CITATION LIST

Patent Literature

[PTL 1] WO 2018/139458 A1
[PTL 2] JP 2021-081980 A
[PTL 3] JP 2020-091814 A
[PTL 4] JP 2019-153330 A
[PTL 5] JP 2019-009728 A

SUMMARY OF INVENTION

Technical Problem

However, in the technologies of Patent Literature 1 to Patent Literature 5, it is required to create a unique fraud detection engine for each service, and thus it takes time and effort to create the fraud detection engines. In this regard, in order to simplify the creation of the fraud detection engines, it is conceivable to utilize the fraud detection engine of a certain service X for the fraud detection engine of another service Y, but in some cases, a fraud in the service Y may not be detectable by the fraud detection engine of the service X. Thus, even when the fraud detection engine of the service X is simply utilized for the service Y, there is a fear in that a fraud in the service Y is not detectable and security may consequently decrease.

An object of the present disclosure is to enhance security while simplifying creation of a fraud detection engine.

Solution to Problem

According to one aspect of the present disclosure, there is provided a fraud detection system including: engine acquisition means for acquiring, based on a first fraud detection engine for detecting a fraud in a first service, a second fraud detection engine for detecting a fraud in a second service; fraud information acquisition means for acquiring fraud information relating to a fraud that has actually occurred in the second service; determination means for determining, based on the fraud information, whether a fraud in the second service is detectable by the second fraud detection engine; and applying means for applying, when it is determined that a fraud in the second service is detectable by the second fraud detection engine, the second fraud detection engine to the second service.

Advantageous Effects of Invention

According to the present disclosure, the security is enhanced while the creation of the fraud detection engine is simplified.

BRIEF DESCRIPTION OF DRAWINGS

FIG. 3 is a diagram for illustrating an example of a flow of fraud detection in the first service.
FIG. 5 is a table for showing an example of a first service database.
FIG. 6 is a table for showing an example of a history database.
FIG. 7 is a table for showing an example of a second service database.
FIG. 8 is a table for showing an example of a fraud information database.
FIG. 9 is a diagram for illustrating an example of a method of acquiring a second fraud detection engine.
FIG. 12 is a diagram for illustrating an example of fraud detection of the first service in the second embodiment.
FIG. 13 is a table for showing an example of a history database.

DESCRIPTION OF EMBODIMENTS

1. First Embodiment

Description is now given of a first embodiment of the present disclosure, which is an example of an embodiment of a fraud detection system according to the present disclosure.

1-1. Overall Configuration of Fraud Detection System

Figure 1:
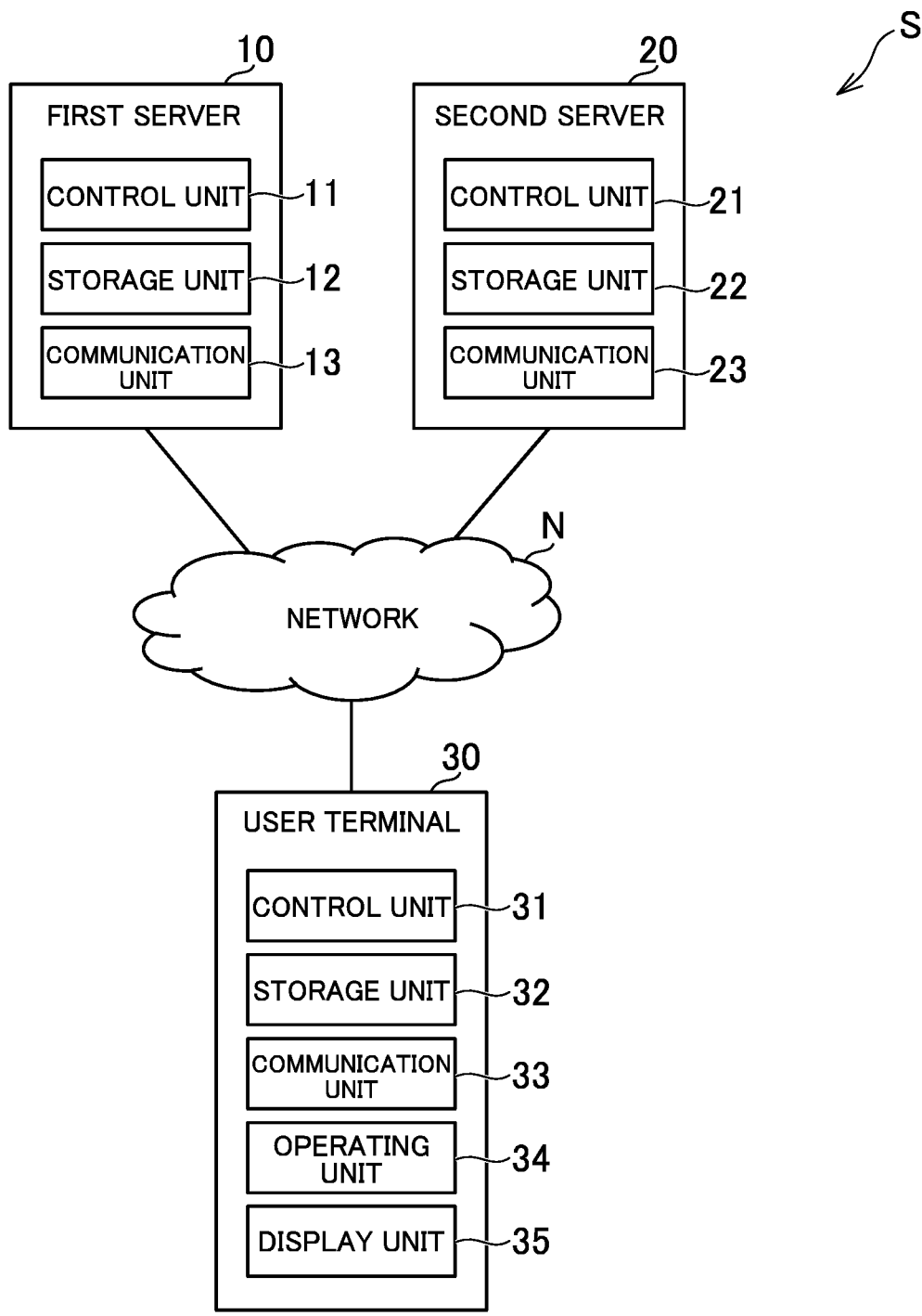
FIG. 1 is a diagram for illustrating an example of an overall configuration of a fraud detection system.

FIG. 1 is a diagram for illustrating an example of an overall configuration of the fraud detection system. A fraud detection system S includes a first server 10, a second server 20, and a user terminal 30. A network N is any type of network, such as the Internet or a LAN. It suffices for the fraud detection system S to include at least one computer, and the fraud detection system S is not limited to the example of FIG. 1.

The first server 10 is a server computer of a first provider which provides a first service. The first server 10 detects a fraud in the first service. A system of the first service including the first server 10 can be referred to as "first fraud detection system." A control unit 11 includes at least one processor. A storage unit 12 includes a volatile memory such as a RAM, and a nonvolatile memory such as a hard disk drive. A communication unit 13 includes at least one of a communication interface for wired communication or a communication interface for wireless communication.

The second server 20 is a server computer of a second provider which provides a second service. The second service is another service different from the first service. In the first embodiment, a case in which the first provider and the second provider are different is described, but the first provider and the second provider may be the same. That is, the second service may be another service provided by the same provider as that of the first service. The provider is an operating company of the service.

The second server 20 detects a fraud in the second service. A system of the second service including the second server 20 can be referred to as "second fraud detection system." The fraud detection system S includes two systems, that is, the first fraud detection system of the first service and the second fraud detection system of the second service. Physical configurations of a control unit 21, a storage unit 22, and a communication unit 23 are the same as those of the control unit 11, the storage unit 12, and the communication unit 13, respectively.

The user terminal 30 is a computer of a user. For example, the user terminal 30 is a personal computer, a smartphone, a tablet computer, or a wearable terminal. Physical configurations of a control unit 31, a storage unit 32, and a communication unit 33 are the same as those of the control unit 11, the storage unit 12, and the communication unit 13, respectively. An operating unit 34 is an input device such as a touch panel. A display unit 35 is a liquid crystal display or an organic EL display.

Programs stored in each of the storage units 12, 22 and 32 may be supplied thereto via the network N. Further, each of the computers may include at least one of a reading unit (for example, a memory card slot) for reading a computer-readable information storage medium, or an input/output unit (for example, a USB port) for inputting and outputting data to/from an external device. For example, the program stored in the information storage medium may be supplied through intermediation of at least one of the reading unit or the input/output unit.

1-2. Overview of Fraud Detection System

In the first embodiment, as an example of the first service, a social networking service (SNS) which is mainly for the purpose of posting images is described. As an example of the second service, an SNS which is mainly for the purpose of posting short messages is described. The first service and the second service may be any services, and are not limited to an SNS. Examples of other services are described later in modification examples.

In the first embodiment, a case in which the first service and the second service are both used by the user is described, but the user may use only one of the first service and the second service. It is sufficient that there is at least one user who uses the first service and at least one user who uses the second service. It is not required that all the users of the first service and all the users of the second service be exactly the same.

In the first embodiment, it is assumed that the user has already registered to use the first service and the second service. The user has already been issued with a user ID and a password for logging in to the first service and a user ID and a password for logging in to the second service. For example, when the user accesses the first server 10 by using an application or a browser of the user terminal 30, a login screen for logging in to the first service is displayed on the display unit 35.

Figure 2:
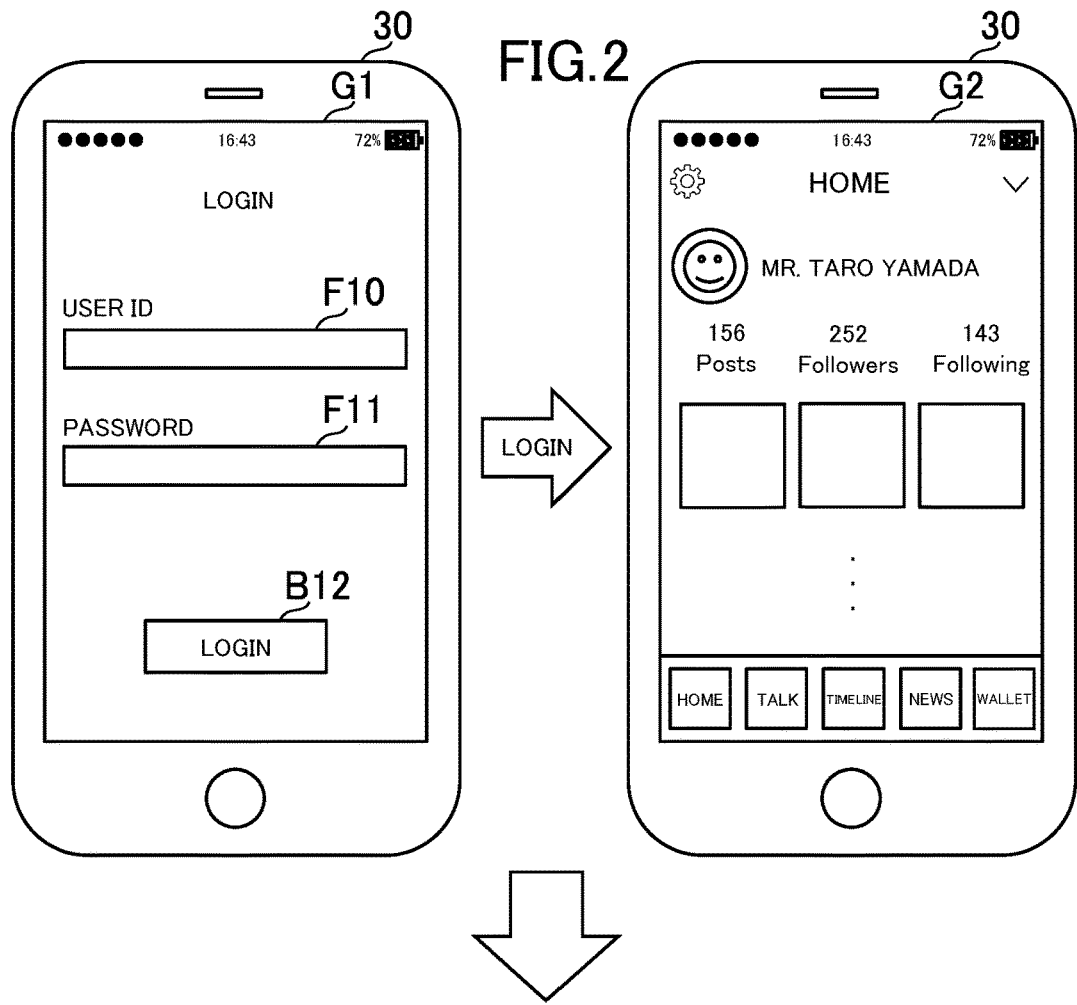
FIG. 2 is a diagram for illustrating an example of how a first service is used by a user.

FIG. 2 is a diagram for illustrating an example of how the first service is used by the user. The user inputs the user ID and the password of the first service in input forms F10 and F11 on a login screen G1, and selects a button B12. When the first server 10 confirms the validity of the user ID and the password, the first server 10 permits login to the first service. When login to the first service is permitted, a home screen G2 of the first service is displayed on the display unit 35. The user uses the first service from the home screen G2. The user can use the second service by logging in to the second service based on the same flow as that of the first service.

A person having a malicious intent may obtain the user ID and password of another person by phishing, for example, and log in to at least one of the first service or the second service by impersonating the another person. A person having a malicious intent is hereinafter referred to as "fraudulent user." A fraudulent user is a user who performs a fraud in at least one of the first service or the second service. A user who is not performing a fraud is hereinafter referred to as "valid user." When a valid user and a fraudulent user are not distinguished from each other, the term "user" is simply used.

As used herein, "fraud" refers to an illegal act, an act that violates the terms of use, or some other act causing a nuisance. In the first embodiment, "spoofing" (fraudulent login) is described as an example of the fraud. Accordingly, spoofing as used in this embodiment can be read as "fraud." The fraud to be detected may be frauds of various types, and is not limited to spoofing. Other types of frauds other than spoofing are described later in the modification examples.

For example, it is assumed that a fraud detection engine for detecting a fraud has already been introduced in the first service. The term "fraud detection engine" is a collective term for the program or system used in fraud detection. It is also assumed that a fraud detection engine has not yet been introduced in the second service, and a fraud is manually determined by receiving a report from users. Further, it is assumed that spoofing is increasing in the second service, and the introduction of a fraud detection engine is being considered. The fraud detection engine of the first service is hereinafter referred to as "first fraud detection engine," and the fraud detection engine of the second service is hereinafter referred to as "second fraud detection engine."

In the first embodiment, it takes a lot of time and effort to create the second fraud detection engine from scratch, and hence the second fraud detection engine is created by utilizing the first fraud detection engine. The second fraud detection engine may be created by simply copying the first fraud detection engine as it is, but because the first service and the second service may not completely match in terms of the data required for fraud detection, the second fraud detection engine is customized to suit the second service.

As the first fraud detection engine itself utilized as the source for the second fraud detection engine, various publicly known engines can be used. In the first embodiment, a first fraud detection engine including a learning model and a rule is taken as an example. The learning model and the rule of the first fraud detection engine are hereinafter referred to as "first learning model" and "first rule," and the learning model and the rule of the second fraud detection engine are hereinafter referred to as "second learning model" and "second rule." When the first learning model and the second learning model are not distinguished from each other, the first learning model and the second learning model are simply referred to as "learning model." When the first rule and the second rule are not distinguished from each other, the first rule and the second rule are simply referred to as "rule."

The learning model is a model which uses machine learning. A learning model is sometimes called "artificial intelligence (AI)." For the machine learning itself, various publicly known methods can be used. As used in the first embodiment, the term "machine learning" includes deep learning and reinforcement learning. The learning model may be any one of supervised machine learning, semi-supervised machine learning, and unsupervised machine learning. For example, the learning model may be a neural network. As the rule itself, various publicly known rules can be used. For example, the rule may include a condition which can be determined based on user feature information.

The user feature information is information relating to a feature of the user. The user feature information may be static information or dynamic information. Static information is information registered in advance. Static information is information which in principle does not change unless the user changes the information by himself or herself. Examples of the static information include a user ID, a user name, a gender, an electronic mail address, an age, a date of birth, nationality, an address, and a combination thereof. Dynamic information is information relating to a user action. Dynamic information is information that can change each time the user accesses the service. Examples of the dynamic information include a location of the user terminal 30, a time at which fraud detection is executed, identification information on the user terminal 30, and a combination thereof.

In FIG. 2, there is illustrated an example of the user feature information acquired when a certain user logs in to the first service. As illustrated in FIG. 2, in the first embodiment, user feature information having a data format defined by JSON, which is a type of domain-specific language, is taken as an example. The data format itself may be a publicly known format. For example, the user feature information is described by writing specific data content in the portion enclosed by curly braces. A character string is written in the portion enclosed by double quotation marks. Numerical values are not enclosed by double quotation marks.

For example, when a certain user requests to log in to the first service from the login screen G1, the first server 10 acquires the user feature information illustrated in FIG. 2. In the example of FIG. 2, the user feature information includes data having a name such as "original." "Original" further includes data having names such as "userid," "ipaddress," and "time." Each of those pieces of data is a piece of data indicating some type of feature of the user.

The "userid" indicates the user ID input by the user. The "ipaddress" indicates the IP address of the user terminal 30. The "time" indicates the date and time at which login is requested. The "deviceid" indicates a device ID that can identify the user terminal 30 of the user. The IP address may change depending on the location, but the device ID does not change depending on the location.

The items "name," "posts," "followers," "following," "gender," "email," and "age" indicate a user name, the number of posts, the number of followers, the number of people the user is following, a gender, an electronic mail address, and an age, respectively, associated with the user ID. The information included in the user feature information may be any information, and is not limited to the example of FIG. 2. In the first service, a fraud is detected based on user feature information like that of FIG. 2.

FIG. 3 is a diagram for illustrating an example of a flow of fraud detection in the first service. The processing steps of Step S1 to Step S5 correspond to the processing of the first fraud detection engine. For example, when a certain user tries to log in to the first service (Step S1), the first server 10 acquires the user feature information (Step S2). In the first embodiment, after user feature information like that illustrated in FIG. 2 is acquired, aggregation processing, for example, for acquiring information to be used in fraud detection is executed. The calculation results of the aggregation processing, for example, are added to the user feature information one after another. For the calculation itself, various publicly known methods can be used. The data to be added is in accordance with the JSON data format.

For example, the first server 10 identifies the municipality corresponding to the IP address based on the "ipaddress," and calculates a distance from the usual central place of use of the user. The first server 10 adds the distance to the user feature information under the data name of "feature1." The first server 10 aggregates, based on the "time," the number of logins in a current time period under the user ID indicated by the "userid." The first server 10 adds the number of logins to the user feature information under the data name of "feature2." The first server 10 can also execute various other calculations, for example. The first server stores the calculation results one after another under predetermined data names in the user feature information. The calculations may be executed on a computer other than the first server 10.

The first server 10 inputs the user feature information to the first learning model, and acquires a score output from the first learning model (Step S3). The first server 10 determines whether or not the first rule is satisfied based on the user feature information (Step S4). As illustrated in FIG. 3, a plurality of first rules may exist, or only a single first rule may exist. The first server 10 stores the score of the first learning model and the determination result of the first rule in a history database DB2 described later (Step S5). The first server 10 permits login when none of the score of the first learning model and the determination result of the first rule indicates a fraud. The first server 10 does not permit login when at least one of the score of the first learning model or the determination result of the first rule indicates a fraud. In this case, additional authentication using, for example, another password or biometric authentication, may be required.

After a certain period of time (for example, several weeks to several months) has passed since the user requested to log in to the first service, a confirmation timing for confirming whether or not there is a fraud is reached (Step S6). The length of the period may be common to all users, or may be a length corresponding to the user. When the confirmation timing is reached, an administrator of the first service uses the user feature information and other information to determine whether or not there is a fraud. The first server 10 stores a result of the confirmation of whether or not there is a fraud in the history database (Step S7).

In the first service, a fraud is detected by the flow described above. The first service and the second service are different from each other as the services, but in terms of the SNS, the first service and the second service are the same type of service. Accordingly, there is a possibility that the trends of fraudulent users in the first service are similar to the trends of fraudulent users in the second service. For example, a fraudulent user who has performed a fraud in the first service may try to perform a fraud in the second service from the same place using the same IP address in the same time period by using the same user terminal 30. Further, the age and number of followers of the valid user that the fraudulent user is trying to spoof may be similar.

Thus, when the trends of frauds in the first service and the trends of frauds in the second service are similar, fraud detection having a sufficiently high accuracy is possible even when the first fraud detection engine is utilized as the second fraud detection engine. However, the trends of frauds in the first service and the trends of frauds in the second service may be different. In this case, a fraud in the second service may not be detected even when the first fraud detection engine is utilized to create the second fraud detection engine. That is, there is a fear in that spoofing in the second service becomes possible, and it is not possible to enhance the security of the second service.

In view of the above, the fraud detection system S of the first embodiment determines whether or not a fraud that has actually occurred in the second service is detectable by the second fraud detection engine created by utilizing the first fraud detection engine. The second fraud detection engine is applied when it is determined that a fraud that has actually occurred in the second service is detectable. As a result, the security of the second service can be enhanced while the creation of the second fraud detection engine is simplified. Details of the first embodiment are now described.

1-3. Functions Implemented in First Embodiment

Figure 4:
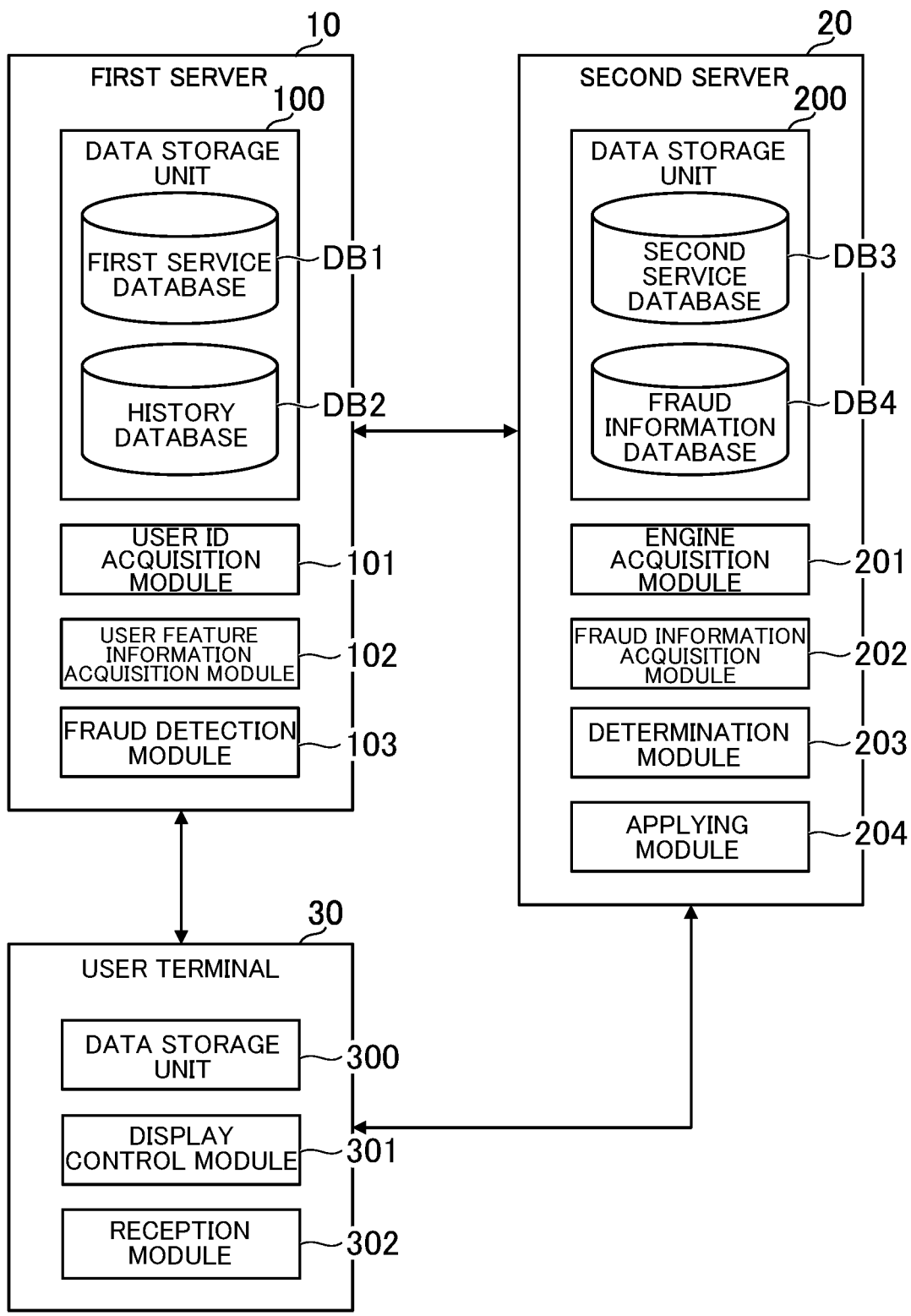
FIG. 4 is a functional block diagram for illustrating an example of functions implemented in a first embodiment of the present disclosure.

FIG. 4 is a functional block diagram for illustrating an example of functions implemented in the first embodiment.

1-3-1. Functions Implemented in First Server

A data storage unit 100 is mainly implemented by the storage unit 12. A user ID acquisition module 101, a user feature information acquisition module 102, and a fraud detection module 103 are mainly implemented by the control unit 11.

Data Storage Unit

The data storage unit 100 stores the data required for detecting a fraud in the first service. For example, the data storage unit 100 stores a first service database DB1 and a history database DB2.

FIG. 5 is a table for showing an example of the first service database DB1. The first service database DB1 is a database in which information relating to the users of the first service is stored. For example, the first service database DB1 stores a user ID, a password, user information, usage situation information, and usage history information in association with each other. When a certain user completes registration to use the first service, a new record is created in the first service database DB1, and the user ID and the like of the user are stored therein.

The user ID is an example of user identification information that can identify the user. Accordingly, "user ID" as used in this embodiment can be read as "user identification information." user identification The information may be information referred to by a name other than user ID. For example, the information referred to as a user name, a user account, or a login ID may correspond to the user identification information. Information such as an electronic mail address or a telephone number may be used as user identification information. The password is authentication information required for login.

The user information is information registered by the user. For example, the user information includes a user name, a gender, an electronic mail address, and an age. The user information may include other information, such as nationality, a telephone number, a date of birth, a postal code, an address, an occupation, an annual income, a user ID of another service linked with the first service, or family structure. The user information may include attributes (for example, age group, and hobbies) for classifying users in some way. Each piece of content indicated by a piece of user information is one feature of the user.

The usage situation information is information relating to the usage situation of the first service. For example, the usage situation information includes the number of posts, the number of followers, the number of people the user is following, content of posts, comments from other users, messages between users, and settings of the first service. When the first service is used by a certain user, the usage situation information on the user is updated. The usage situation information on a certain user may be updated based on use by another user. For example, the usage situation information on a certain user is updated when another user follows the certain user or posts a comment about the certain user. Each piece of content indicated by the usage situation information is one feature of the user.

The usage history information is information relating to the usage history of the first service. The usage history can also be referred to as "action history." The usage situation information is information relating to the usage situation at the present time. Meanwhile, the usage history information is information relating to the usage situation in the past. For example, the usage history information stores the time of a past login, the IP address used in the past login, the device ID of the user terminal 30 used in the past login, and the action of the user in the past login. The usage history information is updated when login occurs. Each piece of content indicated by the usage history information is one feature of the user.

FIG. 6 is a table for showing an example of the history database DB2. The history database DB2 is a database in which the history of fraud detection in the first service is stored. For example, the history database DB2 stores the user feature information, result information, and status information. When a login to the first service occurs, a new record is created in the history database DB2, and information relating to fraud detection executed at the time of the login is stored therein.

The details of the user feature information are as described above. The result information is information relating to the result of fraud detection. In the first embodiment, there is described a case in which the result information indicates whether or not there is a fraud (presence or absence of a fraud), but the result information may be a score indicating a suspicion of a fraud. When the score is expressed by a numerical value, a higher score indicates a higher suspicion of a fraud. Conversely, the score may indicate validity. In this case, a lower score indicates a higher suspicion of a fraud. The score may be expressed by, other than a numerical value, characters such as rank S, rank A, and rank B. The score can also be said as a probability or a likelihood of a fraud.

The status information is information relating to a status of fraud detection. In the first embodiment, when the confirmation timing is reached, the result of fraud detection executed at the time of login is confirmed, and thus the status information indicates whether or not the result of fraud detection is confirmed. In FIG. 6, "not yet confirmed" indicates that the confirmation timing has not been reached. In FIG. 6, "confirmed" indicates that the confirmation timing has been reached. The first fraud detection engine may make a mistake in the determination, and hence the administrator of the first service may correct result information that is not yet confirmed.

The data stored in the data storage unit 100 is not limited to the example described above. The data storage unit 100 can store any data. For example, the data storage unit 100 stores the first fraud detection engine. In the first embodiment, the first fraud detection engine includes the first learning model and the first rule, and thus the data storage unit 100 stores the trained first learning model and the data indicating the content of the first rule.

For example, the first server 10 acquires training data of the first learning model based on the user feature information in a fraud that has actually occurred. The training data may be created by the administrator of the first service, or may be acquired by using a publicly known automatic generation method. For example, the training data is a pair consisting of the user feature information as an input portion and whether or not there is a fraud as an output portion. The first server 10 trains the first learning model such that when the input portion of the training data is input, the output portion of the training data is output. As the learning method itself of the first learning model, a method used in publicly known machine learning may be used. The first server 10 records the trained first learning model in the data storage unit 100. The first server 10 may record a first learning model trained by using unsupervised learning or semi-supervised learning in the data storage unit 100.

For example, the first server 10 records the first rule created by the administrator of the first service in the data storage unit 100. It is not required that the first rule be manually created by the administrator, and a publicly known rule generation method may be used. For example, the first rule may be generated by using machine learning which creates a decision tree. The first rule is not limited to a rule for detecting a fraud, and may be a rule for detecting validity. For example, the first rule may be a rule for determining that a user who satisfies a certain condition is valid.

User ID Acquisition Module

The user ID acquisition module 101 acquires the user ID. The acquired user ID is the user ID of the user who is the target of fraud detection. In the first embodiment, fraud detection is executed when login is requested, and thus the user ID acquisition module 101 acquires the user ID input when the login is requested. For example, the user ID acquisition module 101 acquires the user ID input to the input form F10 on the login screen G1.

User Feature Information Acquisition Module

The user feature information acquisition module 102 acquires user feature information relating to the features of the user in the first service. The user is the user who is the target of fraud detection. The details of the user feature information are as described above. In the first embodiment, user feature information having a data format relating to a domain-specific language, for example, JSON is used, and hence the user feature information acquisition module 102 acquires the user feature information having the data format relating to the predetermined domain-specific language.

For example, the user feature information acquisition module 102 acquires the user feature information based on the user ID acquired by the user ID acquisition module 101. The user feature information acquisition module 102 refers to the first service database DB1, and acquires user feature information based on all or a part of the user information associated with the user ID. In the case of the data example of FIG. 2, the user feature information acquisition module 102 acquires the user name, number of posts, number of followers, number of people the user follows, gender, electronic mail address, and age associated with the user ID as "original" user feature information.

The data name such as "name" included in the user feature information and the field name of the first service database DB1 may be the same or different. When those names are different, it is assumed that data indicating a relationship between the data name such as "name" and the field name of the first service database DB1 is stored in the data storage unit 100. The user feature information acquisition module 102 acquires, from the first service database DB1, information on a field determined in advance to be a field to be used in fraud detection, and acquires the user feature information such that the acquired information is written after the character string indicating the data name corresponding to the field name of the relevant field.

For example, the user feature information acquisition module 102 may acquire the user feature information based on information acquired from the user terminal 30. In the first embodiment, the user terminal 30 transmits the IP address and device ID of the user terminal 30 when requesting login to the first server 10. The user feature information acquisition module 102 acquires the user feature information such that the IP address and device ID acquired from the user terminal 30 are written after the character string indicating the data names "ipaddress" and "deviceid."

The device ID may be an individual identification number of the user terminal 30 or an ID stored in a SIM card. In the first embodiment, the device ID may be an ID issued by the first server 10. In this case, the first server 10 issues a device ID that can identify the user terminal 30 when registration to use the first service is performed on a certain user terminal 30 or when a login occurs by some user ID. The device ID is recorded in the user terminal 30. The user terminal 30 may transmit the device ID to the first server 10 at the time of login.

For example, when login is requested from the user terminal 30, the user feature information acquisition module 102 acquires the user feature information such that the current date and time is written after the character string indicating the data name of "time." It suffices that the current date and time is acquired by using, for example, a real-time clock or GPS. When login is requested from the user terminal 30, the user feature information acquisition module 102 acquires the user feature information such that the user ID input when the login is requested is written after the character string indicating the data name of "userid."

In the first embodiment, the user feature information acquisition module 102 acquires the information to be used for fraud detection based on a calculation such as aggregation processing. For example, the user feature information acquisition module 102 calculates the central place of use of the user based on the usage history information associated with the user ID acquired by the user ID acquisition module 101. The central place of use is an average of the positions of places of use over the whole or a part of a past period. The user feature information acquisition module 102 calculates the distance between a position estimated from the IP address of the user terminal 30 and the central place of use. The user feature information acquisition module 102 acquires the user feature information such that the calculated distance is written after the character string indicating the data name of "feature1."

For example, the user feature information acquisition module 102 calculates a past usage count in the current time period based on the usage history information associated with the user ID acquired by the user ID acquisition module 101. Further, the user feature information acquisition module 102 identifies the device ID and IP address used in the past based on the usage history information. The user feature information acquisition module 102 acquires the user feature information such that the calculated usage count and the identified device ID and IP address are written after the character string indicating the data name of "feature2."

As described above, the user feature information acquisition module 102 acquires the user feature information such that the calculation results to be used for fraud detection are added one after another. Various methods can be used to acquire the user feature information, and the method is not limited to the example of the first embodiment. For example, the user feature information acquisition module 102 may acquire the user feature information without executing a calculation such as an aggregation processing. As another example, the user feature information acquisition module 102 may acquire the user feature information so that only calculations such as aggregation processing are included.

Fraud Detection Module

The fraud detection module 103 detects a fraud in the first service based on the user feature information and the first fraud detection engine. For example, the fraud detection module 103 acquires the output from the first learning model of the first fraud detection engine based on the user feature information. When the user feature information is input, the first learning model calculates and outputs a score indicating a suspicion of a fraud based on the user feature information. When the first training model is a neural network, the input user feature information is convoluted as required. The fraud detection module 103 acquires the score output from the first learning model. Instead of a score, the first training model may output a label indicating whether or not there is a fraud. In this case, the fraud detection module 103 acquires the label output from the first learning model.

For example, the fraud detection module 103 determines, based on the user feature information, whether or not conditions included in the first rule of the first fraud detection engine are satisfied. Each condition is associated with the determination result of the presence or absence of a fraud when the condition is satisfied. That is, in each condition, whether the satisfaction of the condition means "fraud" or "valid" is defined.

In the example of FIG. 3, the fraud detection module 103 determines whether or not a first rule 1-1 is satisfied based on the user feature information. For example, the fraud detection module 103 determines whether or not the distance from the central place of use included in the user feature information is 50 km or more. When the distance is 50 km or more, the fraud detection module 103 determines that there is a fraud. When the distance is less than 50 km, the fraud detection module 103 determines that there is not a fraud.

The fraud detection module 103 determines whether or not a first rule 1-2 is satisfied based on the user feature information. For example, the fraud detection module 103 determines whether or not the usage count in each time period included in the user feature information is less than two. The fraud detection module 103 determines whether or not the device is not normally used by determining whether or not the device ID included in the user feature information is included in the usage history information. The fraud detection module 103 determines that there is a fraud when the usage count in the time period is less than two and the device is not normally used. The fraud detection module 103 determines that there is valid use when the usage count in the time period is two or more or the device is normally used.

The fraud detection module 103 determines whether or not a first rule 1-3 is satisfied based on the user feature information. For example, the fraud detection module 103 determines whether or not the number of posts included in the user feature information is 500 or more. The fraud detection module 103 determines whether or not the number of followers included in the user feature information is 1,000 or more. The fraud detection module 103 determines whether or not the IP address included in the user feature information is the first time that IP address is being used by determining whether or not the IP address is included in the usage history information. The fraud detection module 103 determines that there is a fraud when the number of posts is 500 or more, the number of followers is 1,000 or more, and the IP address is being used for the first time. The fraud detection module 103 determines that there is valid use when the number of posts is less than 500, the number of followers is less than 1,000, or the IP address has been used before.

The fraud detection module 103 determines whether or not each first rule is satisfied based on the user feature information in the same manner as for the other first rules. The fraud detection module 103 may determine that there is a fraud when a predetermined number or more of first rules are satisfied. The fraud detection module 103 determines that the user trying to log in is a fraudulent user when the score from the first learning model is equal to or higher than a threshold value, or when a result indicating a fraud is obtained by the first rule. As another example, the fraud detection module 103 may determine that the user trying to log in is a fraudulent user when the score from the first learning model is equal to or higher than a threshold value and a result indicating a fraud is obtained by the first rule. As another example, the fraud detection module 103 may determine that the user trying to log in is a fraudulent user based on the score from the first learning model and the number of first rules for which a result indicating a fraud is obtained.

1-3-2. Functions Implemented in Second Server

A data storage unit 200 is mainly implemented by the storage unit 22. Each of the other functions is mainly implemented by the control unit 21.

Data Storage Unit

The data storage unit 200 stores the data required for detecting a fraud in the second service. For example, the data storage unit 200 stores a second service database DB3 and a fraud information database DB4.

FIG. 7 is a table for showing an example of the second service database DB3. The second service database DB3 is a database in which information relating to the users of the second service is stored. For example, the second service database DB3 stores a user ID, a password, user information, usage situation information, and usage history information in association with each other. Those pieces of information are different from those of the first service database DB1 in that those pieces of information relate to the second service, but the specifics of each of those pieces of information are the same as those of the first service.

FIG. 8 is a table for showing an example of the fraud information database DB4. The fraud information database DB4 is a database in which fraud information relating to a fraud that has actually occurred in the second service is stored. The fraud information indicates the content of the fraud. The fraud information includes the user feature information on the fraudulent users of the second service. The meaning of the user feature information is the same as that of the first service. In the first embodiment, the user feature information of the second service also has a data format relating to a domain-specific language such as JSON. However, the data names included in the user feature information of the second service and the data names included in the user feature information of the first service may be different. The data names are different, but it suffices that the content indicated by the data is the same or similar.

For example, the fraud information database DB4 stores fraud information including user feature information and result information. The meaning of the result information is the same as that of the first service. In the first embodiment, the fraud information includes the user feature information on the fraudulent users in the second service, and thus the result information indicates that there is a fraud. The fraud information may include user feature information on the valid users in the second service. The features of the valid users are also pieces of information that can be used in fraud detection, and each of those features is one piece of information relating to a fraud that has actually occurred in the second service. When the fraud information includes the user feature information on the valid users in the second service, the result information indicates that the user is valid.

Engine Acquisition Module

An engine acquisition module 201 acquires a second fraud detection engine for detecting a fraud in the second service based on the first fraud detection engine for detecting a fraud in the first service. The second fraud detection engine is created based on at least a portion of the first fraud detection engine. For example, the second fraud detection engine may be created by an administrator of the second service manually customizing the first fraud detection engine. In this case, the engine acquisition module 201 acquires the second fraud detection engine from the terminal of the administrator of the second service.

In the first embodiment, there is described a case in which, instead of the administrator of the second service manually customizing the first fraud detection engine, the engine acquisition module 201 acquires the second fraud detection engine by automatically customizing the first fraud detection engine. The engine acquisition module 201 customizes the first fraud detection engine by changing the content of all or a part of the first fraud detection engine based on a method determined in advance. The engine acquisition module 201 may customize the first fraud detection engine by deleting a part of the content of the first fraud detection engine. The engine acquisition module 201 may customize the first fraud detection engine by adding a function to the first fraud detection engine. The engine acquisition module 201 may combine those changes, deletions, and additions.

For example, in the first fraud detection engine, user feature information having a data format relating to a predetermined domain-specific language is used, and thus the data having this data format is customized to suit the second service. The engine acquisition module 201 changes the data names included in the user feature information used by the first fraud detection engine to the data names to be used in the second service. The engine acquisition module 201 acquires a second fraud detection engine which uses user feature information including the changed data names and has the data format relating to the domain-specific language.

The data indicating the relationship between the data names in the first service and the data names in the second service is stored in advance in the data storage unit 200. Those data names have the same or similar meanings to each other. For example, when the user ID defined by the data name of "userid" in the first service is defined by the data name of "loginid" in the second service, the data name of "userid" of the first service and the data name of "loginid" of the second service are associated with each other. The engine acquisition module 201 customizes the first fraud detection engine by changing the portion of the data name of "userid" included in the first fraud detection engine to the data name of "loginid" of the second service.

As another example, when the time defined by the data name of "time" in the first service is defined by the data name of "date/time" in the second service, the data name of "time" of the first service and the data name of "date/time" of the second service are associated with each other. The engine acquisition module 201 customizes the first fraud detection engine by changing the portion of the data name of "time" included in the first fraud detection engine to the data name of "date/time" of the second service. As another example, when there is data requiring a change to the data name, the engine acquisition module 201 customizes the first fraud detection engine by changing to a data name suited to the second service.

In the first embodiment, the second fraud detection engine does not include the second learning model, and only includes the second rule. The engine acquisition module 201 acquires the second rule included in the second fraud detection engine based on the first rule included in the first fraud detection engine. For example, the engine acquisition module 201 creates the second rule by changing the data name included in the first rule to the data name of the second service.

FIG. 9 is a diagram for illustrating an example of a method of acquiring the second fraud detection engine. For example, when the distance from the central place of use of the data name of "feature1" described with reference to FIG. 3 is defined by the data name of "distance" in the second service, the engine acquisition module 201 creates a second rule 2-1 by changing the data name of "feature1" to "distance." A threshold value of the first rule 1-1 may be changed in the same way as the second rule 2-1. In this case, it is assumed that the method of changing the threshold value (for example, multiplication factor or difference) is defined in advance in the data storage unit 200. The engine acquisition module 201 changes the threshold value of the first rule 1-1 based on this definition and sets the changed threshold value as the threshold value of the second rule 2-1. Other threshold values that are required to be changed are changed in the same manner.

For example, when the usage count of the data name of "feature2" and the device ID of the normally-used user terminal 30 described with reference to FIG. 3 are defined by different data names in the second service, for example, "featueA" and "featueB," the engine acquisition module 201 creates the second rule by changing the data name of "feature2" of the first rule to two data names of "featueA" and "featueB." In addition, the engine acquisition module 201 customizes the first rule to acquire the second rule by changing the data names to suit the second service.

Fraud Information Acquisition Module

A fraud information acquisition module 202 acquires fraud information relating to a fraud that has actually occurred in the second service. In the first embodiment, the fraud information acquisition module 202 acquires a plurality of pieces of fraud information corresponding to a plurality of frauds which have actually occurred in the second service. Each piece of fraud information is stored in the fraud information database DB4, and thus the fraud information acquisition module 202 acquires the plurality of pieces of fraud information stored in the fraud information database DB4. The fraud information acquisition module 202 may acquire all of the pieces of fraud information stored in the fraud information database DB4, or may acquire only a part of the pieces of fraud information.

Determination Module

A determination module 203 determines, based on the fraud information, whether or not a fraud in the second service is detectable by the second fraud detection engine. That is, the determination module 203 evaluates the accuracy of the second fraud detection engine. When the accuracy of the second fraud detection engine is equal to or higher than a threshold value, this means that a fraud in the second service is detectable by the second fraud detection engine. When the accuracy of the second fraud detection engine is less than the threshold value, this means that a fraud in the second service is not detectable by the second fraud detection engine.

In the first embodiment, the second fraud detection engine includes the second rule, and hence the determination module 203 determines whether or not a fraud in the second service is detectable by the second rule based on the fraud information. For example, the determination module 203 calculates a correct answer rate of the second fraud detection engine based on the plurality of pieces of fraud information. The determination module 203 acquires "m" results of fraud detection output from the second fraud engine based on "m" pieces of fraud information. The determination module 203 calculates the rate of results indicating a fraud with respect to the "m" results as the correct answer rate.

The determination module 203 determines whether or not a fraud in the second service is detectable by the second fraud detection engine based on the calculated correct answer rate. When the correct answer rate is equal to or higher than the threshold value (for example, from about 60% to about 90%), this means that a fraud in the second service is detectable by the second fraud detection engine. When the correct answer rate is less than the threshold value, this means that a fraud in the second service is not detectable by the second fraud detection engine. The determination module 203 may determine whether or not a fraud is detectable by the second fraud detection engine by using an index other than the correct answer rate. For example, a relevance ratio or a reproducibility may be used. When the second fraud detection engine includes a learning model like in the modification examples described later, log loss, for example, may be used.

Applying Module

An applying module 204 applies the second fraud detection engine to the second service when it is determined that a fraud in the second service is detectable by the second fraud detection engine. Applying the second fraud detection engine to the second service means recording the second fraud detection engine in the data storage unit 200. Executing fraud detection by the second fraud detection engine is equivalent to applying the second fraud detection engine to the second service. That is, starting actual operation of the second fraud detection engine corresponds to applying the second fraud detection engine to the second service. In the first embodiment, the second fraud detection engine includes the second rule, and thus the applying module 204 applies the second rule to the second service when it is determined that a fraud in the second service is detectable by the second rule.

1-3-3. Functions Implemented in User Terminal

A data storage unit 300 is mainly implemented by the storage unit 32. The other functions are mainly implemented by the control unit 31. The data storage unit 300 stores the data required for providing at least one of the first service or the second service. A display control unit 301 displays various screens on the display unit 35. A reception unit 302 receives various operations from the operating unit 34.

1-4. Processing to be Executed in First Embodiment

Figure 10:
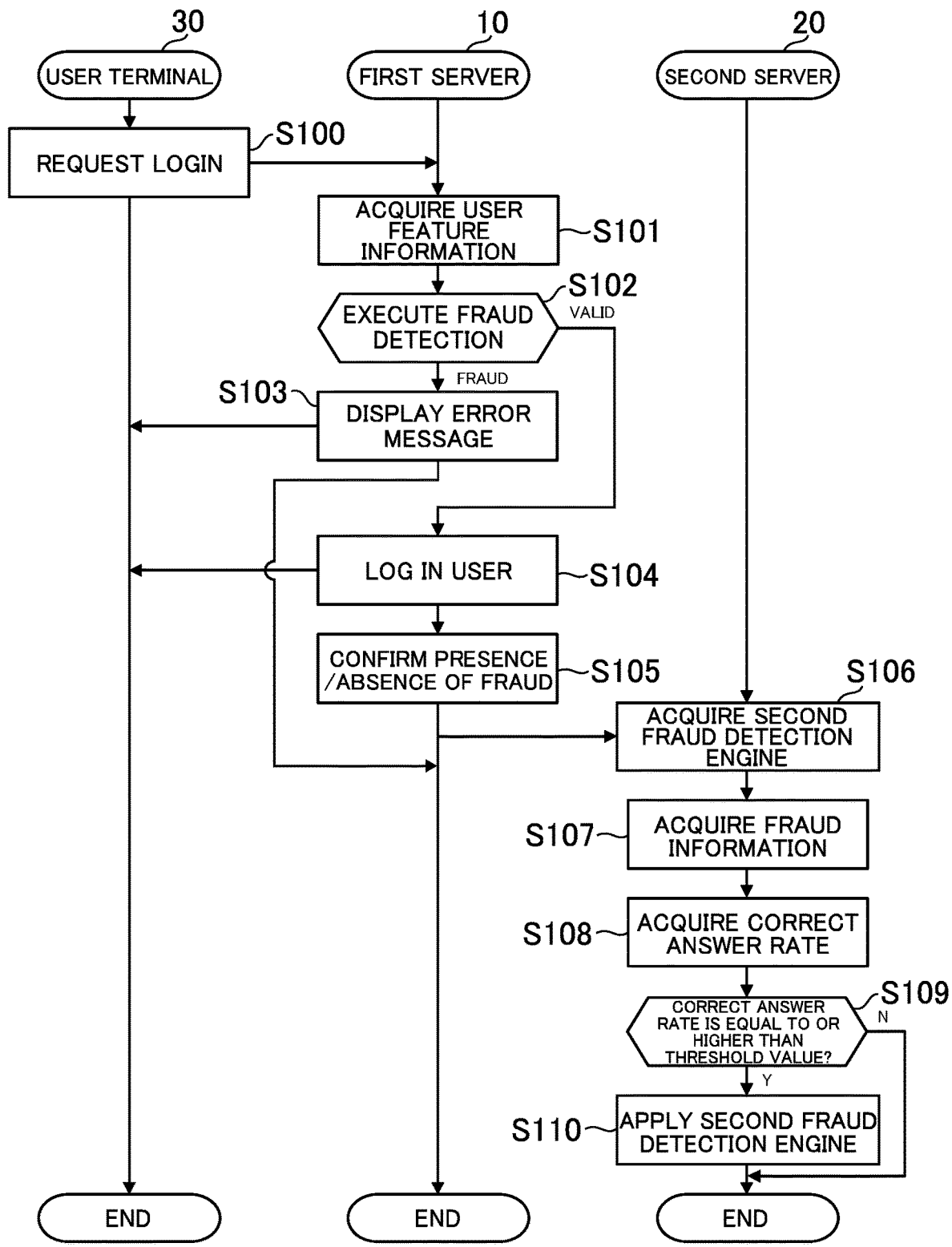
FIG. 10 is a flow chart for illustrating an example of processing to be executed in the first embodiment.

FIG. 10 is a flow chart for illustrating an example of processing to be executed in the first embodiment. The processing is executed by the control units 11, 12, and 31 operating in accordance with programs stored in the storage units 12, 22, and 32, respectively.

When the user ID and password are input to the input forms F10 and F11 on the login screen G1 and the button B12 is selected, the user terminal 30 transmits to the first server 10 a login request for the first service (Step S100). When the first server 10 receives the login request from the user terminal 30, the first server 10 acquires the user feature information based on the first service database DB1 (Step S101), and executes fraud detection by using the first fraud detection engine (Step S102). When the combination of the user ID and the password does not exist in the first service database DB1, the processing steps of Step S101 and Step S102 are not executed, and login to the first service is also not executed.

In Step S101, the first server 10 refers to the record in the first service database DB1 storing the user ID for which login is requested. The first server 10 acquires all or a part of the user information and usage situation information of this record as the static information of the user feature information. The first server 10 acquires the information such as the IP address included in a login request from the user terminal 30 as the dynamic information of the user feature information. The first server 10 executes calculations as such the above-mentioned aggregation processing based on the usage history information of this record, and adds the calculation results to the user feature information one after another.

In Step S102, the first server 10 acquires the score output from the first learning model based on the user feature information acquired in Step S101. The first server 10 determines that there is a fraud when the score is equal to or higher than the threshold value. The first server 10 determines whether or not each of the conditions included in the first rules is satisfied based on the user feature information acquired in Step S101. The first server 10 determines that there is a fraud when the number of satisfied first rules is equal to or higher than a threshold value. The first server 10 determines that there is a fraud when the result of fraud detection of at least one of the first learning model or the first rule indicates a fraud. The first server 10 determines that there is valid use when the result of fraud detection of both the first learning model and the first rule indicates that there is not a fraud. The first server 10 updates the history database DB2 based on those determination results.

When a fraud is detected in Step S102 ("fraud" in Step S102), the first server 10 does not log in the user, and displays a predetermined error message on the user terminal 30 (Step S103). When a fraud is not detected in Step S102 ("valid" in Step S102), the first server 10 logs in the user to the first service (Step S104). The user then uses the first service. When the first service is used by the user, the usage situation information and usage history information stored in the first service database DB1 are updated. When the confirmation timing is reached, the first server 10 confirms the presence or absence of a fraud (Step S105). In Step S105, the first server 10 acquires the result of confirmation of the presence or absence of a fraud from the terminal of the administrator of the first service, and updates the history database DB2.

The second server 20 acquires the second fraud detection engine based on the first fraud detection engine (Step S106). The method of acquiring the second fraud detection engine is as described above. The second server 20 refers to the fraud information database DB4, and acquires the fraud information (Step S107). The second server 20 acquires, based on the fraud information acquired in Step S107, the correct answer rate of the second fraud detection engine acquired in Step S106 (Step S108).

The second server 20 determines whether or not the correct answer rate of the second rule acquired in Step S108 is equal to or higher than the threshold value (Step S109). When it is determined that the correct answer rate is equal to or higher than the threshold value ("Y" in Step S109), the second server 20 applies the second fraud detection engine to the second service (Step S110). Then, a fraud in the second service is detected by using the second fraud detection engine based on the same processing steps as in Step S100 to Step S105 in the first service. When it is determined that the correct answer rate is less than the threshold value ("N" in Step S109), the second server 20 ends the processing without applying the second fraud detection engine to the second service.

According to the fraud detection system S of the first embodiment, when the second fraud detection engine is acquired based on the first fraud detection engine and a fraud in the second service is determined to be detectable by the second fraud detection engine, the second fraud detection engine is applied to the second service. As a result, the security of the second service is enhanced while the creation of the second fraud detection engine is simplified. For example, the second fraud detection engine is applied to the second service after the verification of the accuracy of the second fraud detection engine created by utilizing the first fraud detection engine, and hence a highly accurate second fraud detection engine which is capable of detecting a fraud that is actually occurring in the second service can be applied to the second service. Further, by utilizing the first fraud detection engine actually applied to the first service, a highly accurate second fraud detection engine can be created.

Further, the fraud detection system S applies the second rule to the second service when it is determined, based on the fraud information, that a fraud in the second service is detectable by the second rule. As a result, the security of the second service is enhanced while the creation of the second rule is simplified. For example, it is possible to prevent a situation in which the administrator of the second service is required to spend time and effort to create the second rule from scratch.

Further, the fraud detection system S determines whether or not a fraud in the second service is detectable by the second fraud detection engine based on the correct answer rate of the second fraud detection engine. As a result, a second fraud detection engine having a high accuracy of fraud detection in the second service is applied, and the security of the second service is enhanced.

Further, the fraud detection system S acquires the second fraud detection engine in which a domain-specific language is used based on the first fraud detection engine in which a predetermined domain-specific language is used. Through use of a domain-specific language, it becomes easier to utilize the first fraud detection engine, and thus it becomes easier to create the second fraud detection engine. For example, the second fraud detection engine can be created while the data format of the user feature information input to the first fraud detection engine is maintained to some degree, and hence the time and effort for creating the second fraud detection engine can be reduced more effectively. For example, the second fraud detection engine can be created by only changing the data name of the JSON data format or changing the threshold value of the numerical value indicated by the data having that data name.

2. Second Embodiment

Next, a second embodiment of the present disclosure is described as another embodiment of the fraud detection system S. In the first embodiment, a case in which the second fraud detection engine is acquired by utilizing the first fraud detection engine in the first service is described. When the second fraud detection engine is applied to the second service, a fraud in the second service can be detected. The fraudulent user of the second service may also be a fraudulent user of the first service. When the result of fraud detection in the second service can be fed back to the first service, the accuracy of fraud detection in the first service may be improved.

In view of the above, in the second embodiment, a case in which the fraud detection in the first service is performed by using the result of fraud detection in the second service is described. Description of configurations that are the same as in the first embodiment is omitted. Further, the second fraud detection engine in the second embodiment is not required to be acquired in the same manner as in the first embodiment. That is, it is not required that the fraud detection system S of the second embodiment be premised on the fraud detection system S of the first embodiment. The fraud detection system S of the second embodiment can omit functions described in the first embodiment. The second fraud detection engine may be created by the administrator of the second service without utilizing the first fraud detection engine.

2-1. Functions Implemented in Second Embodiment

Figure 11:
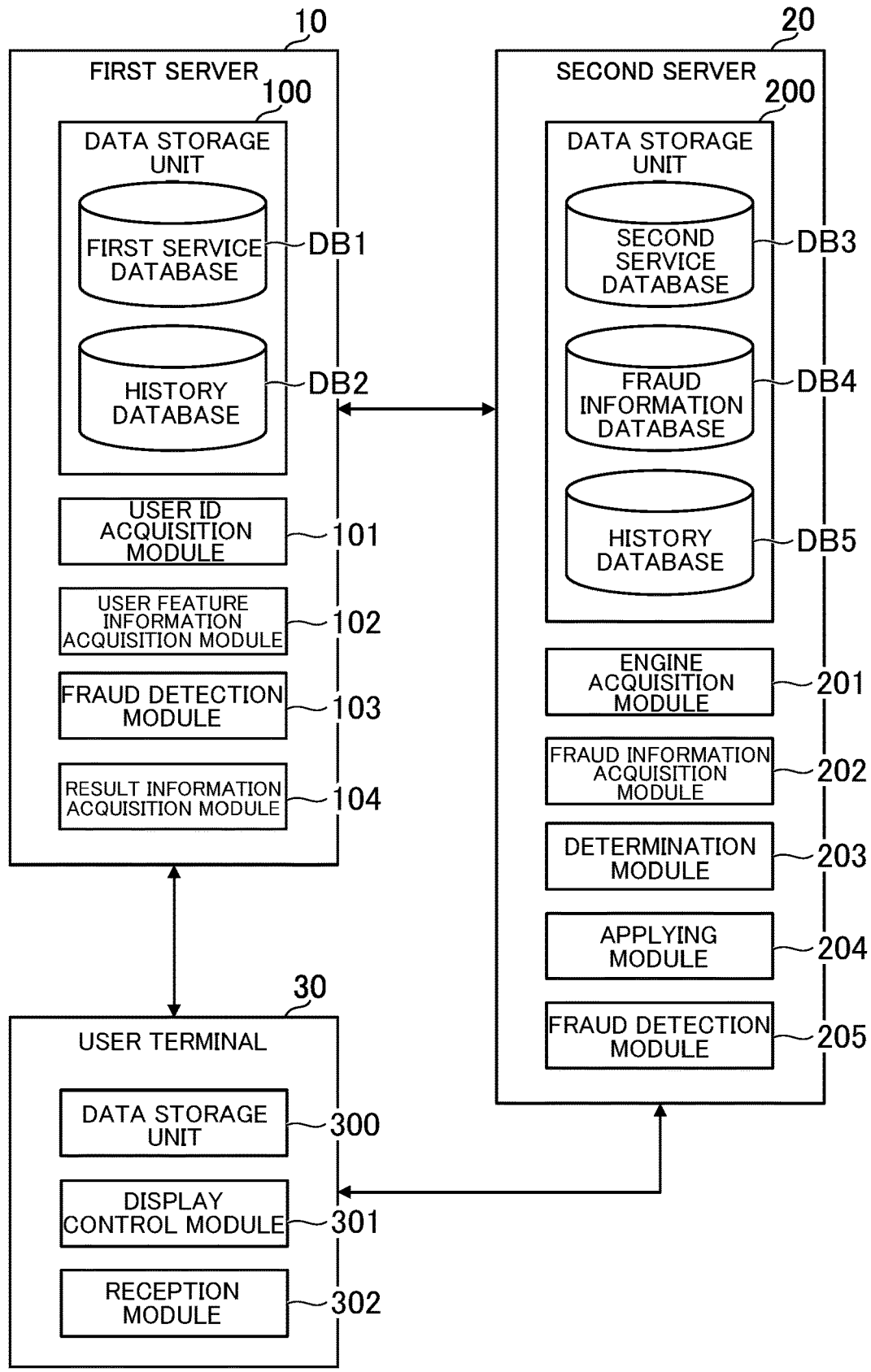
FIG. 11 is a functional block diagram for illustrating an example of functions implemented in a second embodiment of the present disclosure.

FIG. 11 is a functional block diagram for illustrating an example of functions implemented in the second embodiment.

2-1-1. Functions Implemented in First Server

The data storage unit 100, the user ID acquisition module 101, and the user feature information acquisition module 102 are the same as those in the first embodiment. The fraud detection module 103 has functions common to those in the first embodiment, but some functions are different. A result information acquisition module 104 is mainly implemented by the control unit 11.

Result Information Acquisition Module

The result information acquisition module 104 acquires, based on the user ID, result information relating to the result of fraud detection of the user in the second service which uses a different fraud detection engine for detecting a fraud from the first service. The user ID may be the user ID of the first service or the user ID of the second service. As described in the first embodiment, the fraud detection of the second service is executed based on user feature information having a data format in a predetermined domain-specific language, and thus the result information acquisition module 104 acquires result information relating to the result of fraud detection in the second service executed by using user feature information having a data format in a domain-specific language.

In the second embodiment, data indicating a relationship between the user ID of the first service of a certain user and the user ID of the second service of the certain user is stored in the data storage unit 100. The user ID of the first service is hereinafter referred to as "first user ID," and the user ID of the second service is hereinafter referred to as "second user ID." When the first user ID and the second user ID are not distinguished from each other, the first user ID and the second user ID are simply referred to as "user ID."

The result information acquisition module 104 acquires result information based on the second user ID associated with the first user ID acquired by the user ID acquisition module 101. The result information acquisition module 104 transmits to the second server 20 a request for the result information associated with the second user ID associated with the first user ID. When the second server 20 receives the request, the second server 20 refers to a history database DB5 described later, and transmits the result information associated with the second user ID to the first server 10. The result information acquisition module 104 acquires the result information transmitted by the second server 20.

The data storage unit 200 of the second server 20 may store the first user ID of a certain user and the second user ID of the certain user in association with each other. In this case, the result information acquisition module 104 transmits to the second server 20 a request for the result information together with the first user ID acquired by the user ID acquisition module 101. When the second server 20 receives the request, the second server 20 acquires the second user ID associated with the first user ID. The second server 20 refers to the history database DB5 described later, and transmits the result information associated with the second user ID to the first server 10. The result information acquisition module 104 acquires result information the transmitted by the second server 20.

The first user ID of the certain user and the second user ID of the certain user may be the same. That is, a common user ID may be used for the first service and the second service. In this case, it suffices for the result information acquisition module 104 to transmit to the second server 20 a request for the result information together with the user ID acquired by the user ID acquisition module 101. The second server 20 refers to the history database DB5 described later, and transmits the result information associated with the user ID to the first server 10. The result information acquisition module 104 acquires the result information transmitted by the second server 20.

Fraud Detection Module

FIG. 12 is a diagram for illustrating an example of fraud detection of the first service in the second embodiment. As illustrated in FIG. 12, in the second embodiment, data indicating the result of fraud detection in the second service is added to the user feature information in the first service. In the example of FIG. 12, data having the data name of "service2" is the result information in the second service. In the second embodiment, a case in which the result information in the second service is incorporated in a part of the user feature information is described, but it is not required that the result information be incorporated in the user feature information. The first learning model of the first fraud detection engine executes fraud detection by using the result of fraud detection in the second service as one feature amount. The first rule of the first fraud detection engine uses the result of fraud detection in the second service as one condition.

The fraud detection module 103 detects a fraud in the first service based on the user feature information in the first service and the result information in the second service. For example, the fraud detection module 103 detects a fraud in the first service based on the user feature information in the first service and the result information based on the second rule in the second service. The fraud detection module 103 incorporates the result information in the second service into a part of the user feature information in the first service, and detects a fraud in the first service based on the user feature information including the result information.

For example, as illustrated in FIG. 12, the result information in the second service is included as one of the conditions of the first rule. For example, when the result information in the second service indicates a fraud, the fraud detection module 103 determines that there is a fraud in the first service as well. As another example, when the result information indicates a score, the fraud detection module 103 may detect a fraud in the first service by determining whether or not a total value of the score output by the first learning model of the first fraud detection engine and the score indicated by the result information is equal to or higher than a threshold value. Further, the first learning model may be trained based on training data including the result information in the second service, and the fraud detection module 103 may input user feature information including the result information to the first learning model and acquire the output from the first learning model. Each process executed by the fraud detection module 103 may be automatically executed by a learning model using machine learning.

2-1-2. Functions Implemented in Second Server

A fraud detection module 205 is mainly implemented by the control unit 21. The fraud detection module 205 detects a fraud in the second service based on the second fraud detection engine. The fraud detection module 205 is different from the fraud detection module 103 of the first server 10 in that the fraud detection module 205 detects a fraud in the second service. However, the fraud detection method itself is the same. Thus, the fraud detection processing of the fraud detection module 205 is the same as that described regarding the fraud detection processing of the fraud detection module 103.

In the second service, a second rule including a determination condition relating to a fraud in the second service is used. The result information, which is the determination result of the fraud detection module 205, indicates the result of fraud detection in the second service determined based on the second rule. The engine acquisition module 201, the fraud information acquisition module 202, the determination module 203, and the applying module 204 are the same as those in the first embodiment. The data storage unit 100 is similar to that in the first embodiment, but some functions are different.

FIG. 13 is a table for showing an example of the history database DB5. The history database DB5 is a database in which a history of fraud detection in the second service is stored. For example, the history database DB5 stores user feature information, result information, and status information. When a login to the second service occurs, a new record is created in the history database DB2, and information relating to the fraud detection executed at the time of the login is stored therein. The history database DB5 is different from the history database DB2 in that those pieces of information relate to the second service. The details of those pieces of information are the same as for the first service. Further, the point that the presence or absence of a fraud is confirmed when a confirmation timing is reached after a certain amount of time has passed since login may also be the same as for the first service.

2-1-3. Functions Implemented in User Terminal

The functions of the user terminal 30 are the same as in the first embodiment.

2-2. Processing to be Executed in Second Embodiment

Figure 14:
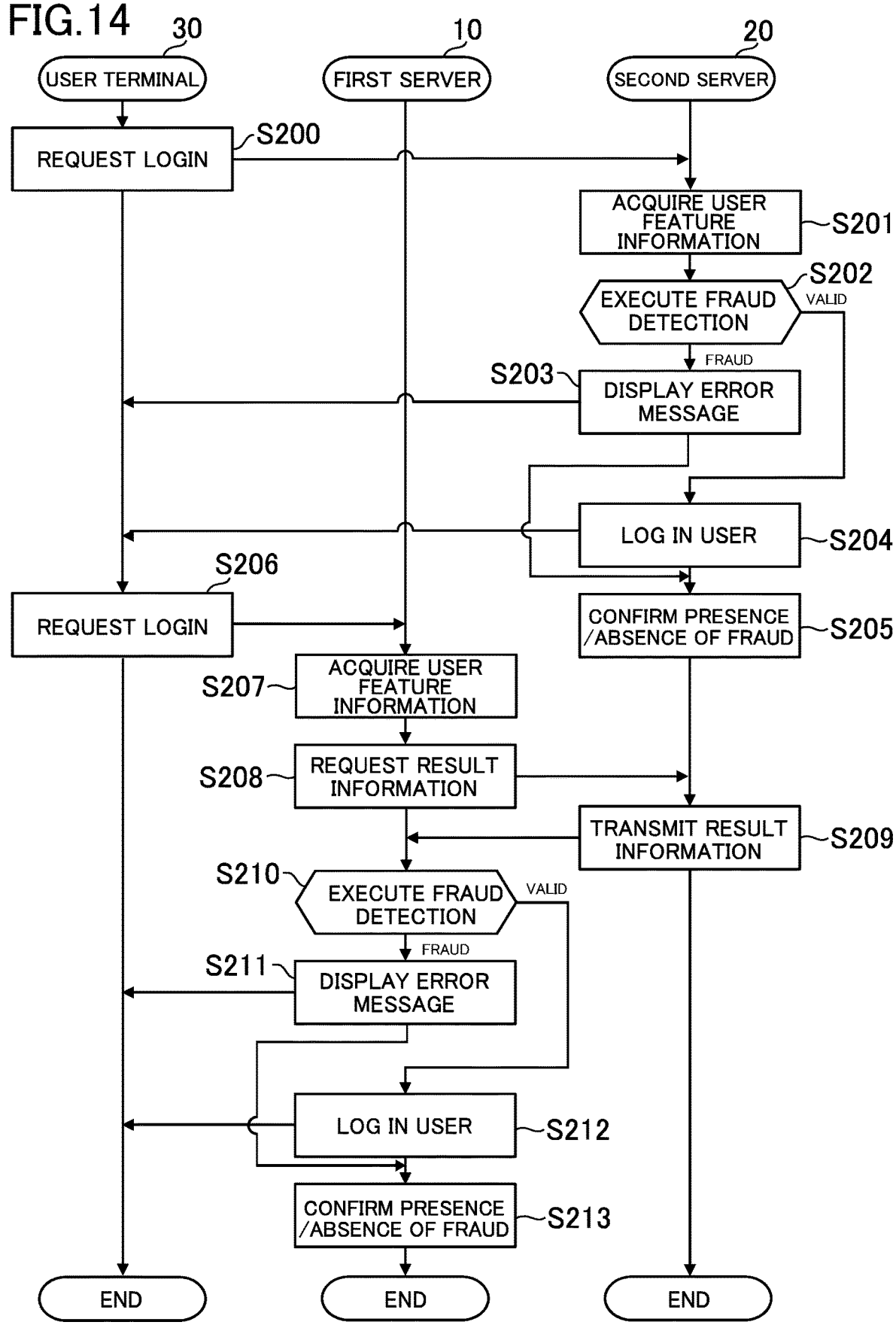
FIG. 14 is a flow chart for illustrating an example of processing to be executed in the first embodiment.

FIG. 14 is a flow chart for illustrating an example of the processing to be executed in the first embodiment. The processing is executed by the control units 11, 12, and 31 operating in accordance with programs stored in the storage units 12, 22, and 32, respectively.

The processing steps of from Step S200 to Step S205 are different from the processing steps of from Step S100 to Step S105 in terms of the point that fraud detection in the first service is executed between the first server 10 and the user terminal 30 and fraud detection in the second service is executed between the second server 20 and the user terminal 30, but the other points are the same as those of Step S100 to Step S105.

The processing steps of Step S206 and Step S207 are the same as the processing steps of Step S100 and Step S101. When the first server 10 receives a login request from the user terminal 30, the first server 10 transmits to the second server 20 a request for the result information on the user requesting to login (Step S208). When the second server 20 receives the request for the result information, the second server 20 acquires the result information by referring to the history database DB5, and transmits the result information to the first server 10 (Step S209).

When the first server 10 receives the result information, the first server 10 incorporates the received result information as a part of the user feature information acquired in Step S207, and executes fraud detection by using the first fraud detection engine (Step S210). The processing S210 is different from that in the first step of Step embodiment in that the result information in the second service is taken into consideration in the fraud detection of the first service, but is the same in terms of the other points. The subsequent processing steps of from Step S211 to Step S213 are the same as the processing steps of from Step S103 to Step S105. The point that the fraud detection of the first service is not executed and the login to the first service is not executed is the same as in the first embodiment.

According to the fraud detection system S of the second embodiment, a fraud in the first service is detected based on the user feature information in the first service and the result information in the second service. As a result, fraud detection in the first service is executed by comprehensively considering the result of fraud detection in the second service as well, and thus the security of the first service is enhanced. For example, when the trends of frauds in the first service and the trends of frauds in the second service are similar to each other, the result information in the second service may be considered to be useful also for fraud detection in the first service. Thus, through use of the result information in the second service, the accuracy of fraud detection in the first service is improved, and the security of the first service is enhanced.

Further, the fraud detection system S detects a fraud in the first service based on the user feature information in the first service and the result information based on the second rule in the second service. As a result, fraud detection in the first service is executed by comprehensively considering the result of fraud detection using the second rule in the second service as well, and thus the security of the first service is enhanced.

Further, the fraud detection system S acquires the result information relating to the result of fraud detection in the second service executed by using user feature information having a data format in a domain-specific language. Through use of the same domain-specific language data format in the first service and the second service, the first service and the second service can easily cooperate with each other.

3. Modification Examples

The present disclosure is not limited to the embodiments described above, and can be modified suitably without departing from the spirit of the present disclosure.

3-1. Modification Examples of First Embodiment

Figure 15:
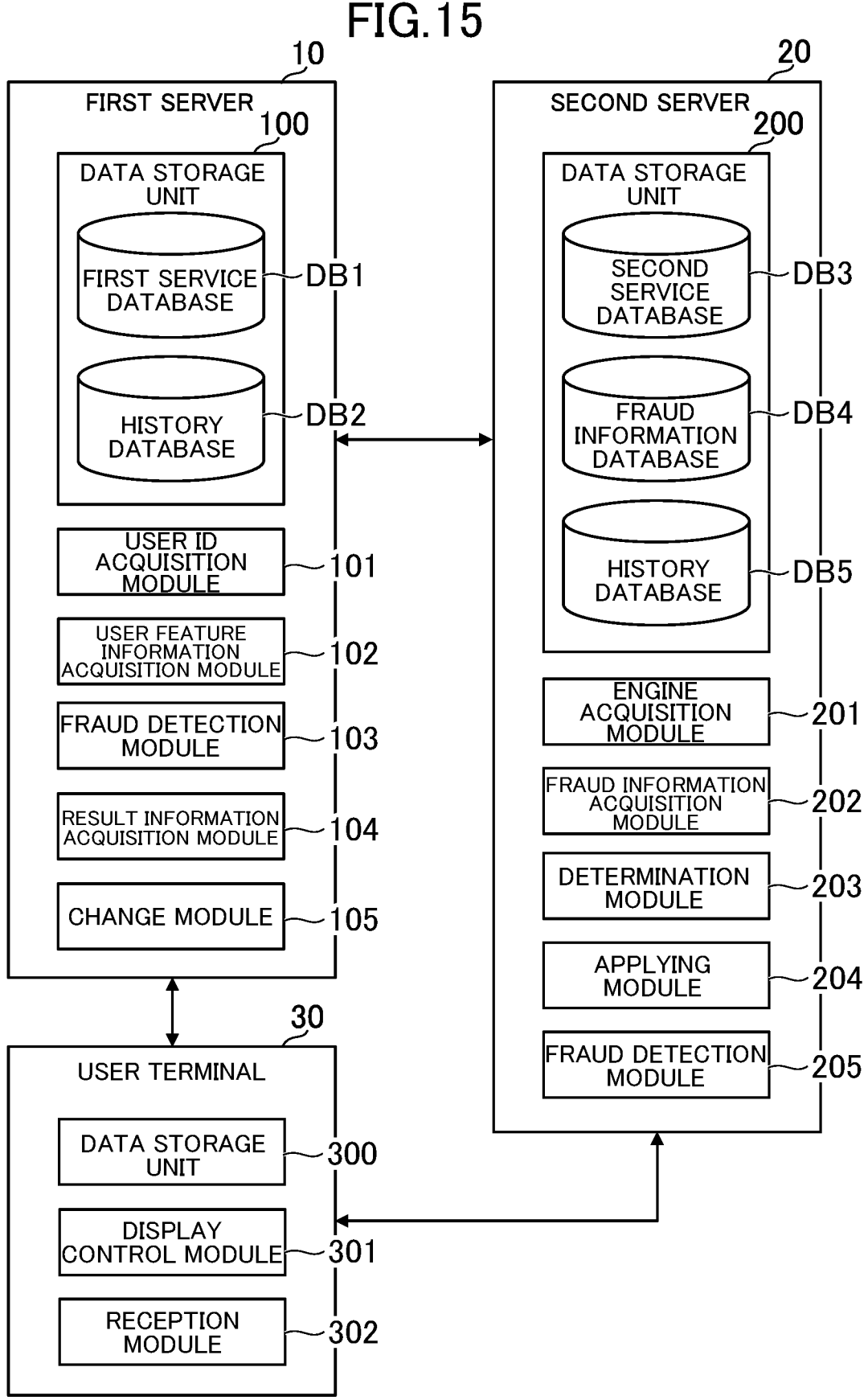
FIG. 15 is a functional block diagram of modification examples of the first embodiment.

First, modification examples of the first embodiment are described. FIG. 15 is a functional block diagram of modification examples of the first embodiment. A change module 105 is mainly implemented by the control unit 21. The fraud detection module 205 is as described in the second embodiment.

Modification Example 1-1

For example, the first service and the second service may be any services, and are not limited to the examples of the first embodiment and the second embodiment. For example, the first service may be a first electronic payment service, and the second service may be a second electronic payment service different from the first electronic payment service. In the following modification examples, a case in which fraud detection is executed in those electronic payment services is described. The first electronic payment service is simply referred to as "first service," and the second electronic payment service is simply referred to as "second service."

In the first service and the second service, any electronic payment is possible. Examples of payment means that can be used include a credit card, a debit card, electronic money, points, electronic cash, a bank account, virtual currency, a wallet, and other items having electronic value. Electronic payment using barcode or a two-dimensional code, electronic payment using short-range wireless communication, and electronic payment using biometric authentication can also be used. In Modification Example 1-1, a case in which a credit card is used in the first service and electronic money is used in the second service is taken as an example. For the electronic payment itself using a credit card, various publicly known methods can be used. For the electronic payment itself using electronic money as well, various publicly known methods can be used.

Information on each payment is stored in the first service database DB1 in Modification Example 1-1. The first service database DB1 can also be referred to as "payment database." For example, card information and usage history information are stored in the first service database DB1. The card information is information relating to each credit card. For example, the card information includes a card number, expiry date, holder information, and usable limit. The holder information may store not only the name of the holder but also information such as a telephone number and an address. The usage history information is information relating to the usage history of the credit card. For example, the usage history information includes a date and time of use, a place of use (shop used), and the usage amount. Each credit card can be identified by the card number, and hence it is not required to include the user ID in the first service database DB1 in Modification Example 1-1. The place of use may be acquired by using GPS information on the user terminal 30, or may be the position of the shop in which electronic payment is executed.

The history database DB2 in Modification Example 1-1 is the same as that in the first embodiment, but the user feature information is different in that the user feature information includes information relating to the credit card instead of information relating to the SNS. For example, the user feature information includes information such as the place of use, date and time of use, usage amount, distance from central place of use, difference from normal usage time, difference from average usage amount, amount borrowed by cash advance, and annual income of user of the credit card. The result information and the status information are the same as in the first embodiment.

Similarly to the first service database DB1, information on each payment is stored in the second service database DB3 in Modification Example 1-1. For example, electronic money information and usage history information are stored in the first service database DB1. The electronic money information is information relating to each piece of electronic money. For example, the electronic money information includes an electronic money ID, balance, and holder information. The usage history information is information relating to the usage history of the electronic money. For example, the usage history information includes a date and time of use, a place of use (shop used), and the usage amount. Each piece of electronic money can be identified by the electronic money ID, and hence it is not required to include the user ID in the second service database DB3 in Modification Example 1-1.

The fraud information database DB4 in Modification Example 1-1 is the same as that in the first embodiment, but the user feature information is different in that the user feature information includes information relating to the electronic money instead of information relating to the SNS. For example, the user feature information may include information such as the place of use, date and time of use, usage amount, distance from central place of use, difference from normal usage time, difference from average usage amount, amount borrowed by cash advance, and annual income of user of the electronic money. The result information is the same as in the first embodiment. The history database DB5 is also different from that in the second embodiment in terms of the point that the history database DB5 includes information relating to electronic money, but the other points are the same as in the second embodiment.

The flow itself of fraud detection in Modification Example 1-1 is the same as the flow in the first embodiment described with reference to FIG. 3. However, the login in Step S1 of FIG. 3 is a request for payment by credit card. When the user requests payment by using a credit card (Step S1), the first server 10 acquires the user feature information (Step S2). For example, the first server 10 acquires various types of information such as the credit card number, holder information, distance from the central place of use, difference from normal usage time, and difference from the average usage amount of the credit card to be used for requested payment, and stores the acquired information in the user feature information having a JSON format one after another.

The first server 10 acquires the output from the first learning model based on the user feature information (Step S3). The first learning model has learned training data including user feature information relating to the use of the credit card and information on the presence or absence of a fraud using the credit card. When the user feature information is input, the first learning model performs convolutions as required, and outputs a score indicating a suspicion of a fraud. The term "fraud" as used regarding a credit card refers to the use of the credit card of another person by a fraudulent user. In the case of electronic payment using a barcode or a two-dimensional code displayed on the user terminal 30, logging in by spoofing with the user ID and password of another person and using the barcode or two-dimensional code corresponds to a fraud.

The first server 10 acquires the determination result of the first rule based on the user feature information (Step S4). The first rule includes user feature information conditions relating to the use of the credit card. For example, the first rule may be, in addition to a rule relating to the distance from the central place of use, difference from normal usage time, and difference from normally used device, which are the same as in the first embodiment, a rule relating to difference from the average usage amount. In addition, for example, the first rule may be a rule that determines a valid use in the case of a specific holder.

The first server 10 stores the output from the first learning model and the determination result of the first rule in the history database DB2 (Step S5). The first server 10 does not permit payment when it is determined by the first learning model that there is a fraud or when it is determined by the first rule that there is a fraud. When is not determined by the first learning model that there is a fraud and it is not determined by the first rule that there is a fraud, the first server 10 executes payment. When a certain period of time has passed since payment and the confirmation timing is reached (Step S6), the administrator of the first service confirms whether or not the payment is a fraud (Step S7), and the history database DB2 is updated.

In Modification Example 1-1 as well, the engine acquisition module 201 acquires the second fraud detection engine for detecting a fraud relating to electronic money based on the first fraud detection engine for detecting a fraud relating to a credit card. The fraud information acquisition module 202 acquires fraud information relating to a fraud that has actually occurred by using electronic money. The determination module 203 determines whether or not a fraud relating to electronic money is detectable by the second fraud detection engine. When it is determined that a fraud relating to electronic money is detectable by the second fraud detection engine, the applying module 204 applies the second fraud detection engine to the second service. Even in electronic money fraud detection, it may be possible to utilize the rules used for credit card fraud detection, for example, the distance from the central place of use, difference from the normal usage time, and difference from the normally used device, and hence the suitability of utilizing such rules is verified.

According to Modification Example 1-1, the security of the second electronic payment service is enhanced while the creation of the second fraud detection engine is simplified.

Modification Example 1-2

For example, as described in the first embodiment, in the first fraud detection engine, a first learning model which outputs a first score relating to a fraud in the first service is used. In this case, the first rule included in the first fraud detection engine may include a condition relating to the first score. For example, as a condition for determining that there is a fraud, a condition may be set such that when the first score is equal to or higher than a threshold value, it is determined that there is a fraud. Conversely, as a condition for determining that there is valid use, a condition may be set such that when the first score is less than a threshold value, it is determined that there is valid use.

Further, in the second fraud detection engine, a second learning model which outputs a second score relating to a fraud in the second service is used. In this case, the second rule included in the second fraud detection engine may include a condition relating to the second score. For example, as a condition for determining that there is a fraud, a condition may be set such that when the second score is equal to or higher than a threshold value, it is determined that there is a fraud. Conversely, as a condition for determining that there is valid use, a condition may be set such that when the second score is less than a threshold value, it is determined that there is valid use. The threshold value of the second rule may be the same as or different from the threshold value of the first rule. The data name indicating the second score and the threshold value may be customized like in the first embodiment. The second learning model may be created by utilizing the first learning model like in Modification Example 1-3 described later, or may be created without utilizing the first learning model in particular.

According to Modification Example 1-2, a second learning model which outputs a second score relating to a fraud in the second service is used for the second rule included in the second fraud detection engine. As a result, fraud detection service is executed by comprehensively of the second considering the result of fraud detection by the second learning model as well, and the security of the second service is enhanced.

Modification Example 1-3

For example, in the second fraud detection engine, a second learning model based on the first learning model may be used. The engine acquisition module 201 acquires a second learning model including a parameter based on a parameter of the first learning model. The second learning model may be a learning model that is an exact copy of the first learning model, or a part of the first learning model may be changed to suit the second service.

The engine acquisition module 201 may acquire the second learning model by changing or deleting a part of the first learning model, or acquire the second learning model by adding a function to the first learning model. For example, when the first learning model is a neural network, the engine acquisition module 201 may acquire the second learning model by replacing the input layer of the first learning model with an input layer changed to suit the user feature information of the second service.

For example, it is assumed that "n" ("n" is a natural number) items of the user feature information of the first service are input to the first learning model, and "k" ("k" is a natural number less than "n") items of the user feature information of the second service are input to the second learning model. It is assumed that the content indicated by "k" items is the same as or similar to the content indicated by "k" items out of "n" items. For example, it is assumed that, when the "k" items include the distance from the central place of use, the usage amount, and the usage time when electronic money is used in the second service, the "n" items include the distance from the central place of use, the usage amount, and the usage time when a credit card is used in the first service. The engine acquisition module 201 changes the input layer of the first learning model in which "n" items are input such that only "k" items are input, and acquires the second learning model. Out of the "n" items, the missing items (n-k items) may be treated as missing values.

For example, the engine acquisition module 201 may acquire the second learning model by replacing the output layer of the first learning model with an output layer changed such that the desired result is obtained by the fraud detection of the second service. For example, it is assumed that the first learning model outputs a score, and in the second service, it is desired to obtain a label indicating whether or not there is a fraud, instead of a score. In this case, the engine acquisition module 201 acquires the second learning model by changing such that the output layer of the first learning model which outputs a score is replaced with an output layer which outputs a label. In addition, the engine acquisition module 201 may acquire the second learning model by changing or deleting a part of an intermediate layer of the first learning model.

The determination module 203 determines, based on the fraud information, whether or not a fraud in the second service is detectable by the second learning model. Similarly to the first embodiment, it suffices that the determination method uses a correct answer rate. The applying module 204 applies the second learning model to the second service when it is determined that a fraud in the second service is detectable by the second learning model. The only difference from the first embodiment is that not the second rule but the second learning model is applied to the second service. The processing itself of the applying module 204 is as described in the first embodiment.

According to Modification Example 1-3, when the determination module 203 determines, based on the fraud information, that a fraud in the second service is detectable by the second learning model based on the first learning model, the second learning model is applied to the second service. As a result, security is enhanced while the time and effort for creating the second learning model is saved.

Modification Example 1-4

For example, the fraud detection system S may include the result information acquisition module 104 and the change module 105. The result information acquisition module 104 acquires the result information relating to the result of fraud detection in the second service when the second fraud detection engine is applied to the second service. The result information acquisition module 104 is as described in the second embodiment.

The change module 105 executes processing for changing the first fraud detection engine based on the result information. As described in the second embodiment, the processing may be processing of incorporating the result information in the second service as one of the first rules, or may be other processing. The other processing may be processing of notifying the administrator of the first service of the result information acquired from the second service, and urging the administrator to change the first fraud detection engine. In addition, for example, the other processing may be processing of forming the result information in the second service into one feature amount to be input to the first learning model. For example, the change module 105 may change the first fraud detection engine so that the first fraud detection engine uses the result information in fraud detection in the first service.

According to Modification Example 1-4, when the second fraud detection engine is applied to the second service, processing for changing the first fraud detection engine is executed based on the result information relating to the result of fraud detection in the second service. As a result, the result of fraud detection in the second service is also used for fraud detection in the first service, and the security of the first service is enhanced.

Modification Example 1-5

For example, as described in the first embodiment, in the first service, when the first user of the first service uses the first service, a fraud by the first user is detected based on the first fraud detection engine. In the first service, the presence or absence of a fraud by the first user is confirmed after the first service is used by first user.

In the second service, when the second user of the second service uses the second service, a fraud by the second user may be detected based on the second fraud detection engine. In the second service, the presence or absence of a fraud by the second user may be confirmed after the second service is used by the second user. The second service may be a service in which the length of the period from the use of the second service to the confirmation of the presence or absence of a fraud is shorter than that in the first service. That is, the length from the use of the second service to the confirmation timing of a fraud is shorter than the length from the use of the first service to the confirmation timing of a fraud.

According to Modification Example 1-5, the second service is a service in which the length of the period from the use of the second service to the confirmation of the presence or absence of a fraud is shorter than that in the first service. As a result, it is possible to provide feedback to the first service on the latest fraud trends in the second service. For example, it is assumed that it takes about two months to confirm a fraud in the first service, and it takes about two weeks to confirm a fraud in the second service. In this case, when there is a change in the fraud trends, it may take about two months to grasp this change in the first service, but by providing feedback to the first service on the results of fraud detection in the second service in which changes in fraud trends can be grasped earlier, it becomes easier to respond to changes in frauds in the first service.

Modification Example 1-6

For example, the result of fraud detection in a third service may be used by the first fraud detection engine. The third service is a service different from the first service and the second service. In Modification Example 1-6, a case in which the third service is a third electronic payment service is described, but the third service may be any other service, and is not limited to the third electronic payment service. Any payment means may be used as the payment means in the third electronic payment service. In Modification Example 1-6, a case in which points are used is described. A publicly known method can be used for the electronic payment using points itself.

For example, the first learning model of the first fraud detection engine uses the result of fraud detection in the third service as one feature amount. The first rule of the first fraud detection engine uses the result of fraud detection in the third service as one condition. The engine acquisition module 201 acquires, based on the first fraud detection engine, a second fraud detection engine in which the result of fraud detection in the third service is to be utilized. The second learning model of the second fraud detection engine uses the result of fraud detection in the third service as one feature amount. The second rule of the second fraud f detection engine uses the result of fraud detection in the third service as one condition. In Modification Example 1-6 as well, the engine acquisition module 201 may acquire the second fraud detection engine by changing the data name or threshold value indicating the result of fraud detection in the third service as required.

According to Modification Example 1-6, a second fraud detection engine which uses the result of fraud detection in the third service is acquired based on the first fraud detection engine. As a result, the result of fraud detection in the third service can be used in the second service, and thus the results of fraud detection in various services are comprehensively considered, and the security of the second service is enhanced.

Modification Example 1-7

For example, when a plurality of first services exist, the engine acquisition module 201 may acquire the second fraud detection engine based on a plurality of first fraud detection engines corresponding to the plurality of first services. For example, a certain first service is an electronic payment service provided by a certain card company. Another first service is an electronic payment service provided by another card company. The method of utilizing each first fraud detection engine is as described in the first embodiment. The engine acquisition module 201 is not required to utilize all of the plurality of first fraud detection engines, and may utilize only a part of the plurality of first fraud detection engines. The engine acquisition module 201 acquires the second fraud detection engine by changing the data name or threshold value of each of the plurality of fraud detection engines.

According to Modification Example 1-7, the second fraud detection engine is acquired based on a plurality of first fraud detection engines corresponding to a plurality of first services. As a result, the second fraud detection engine is acquired by comprehensively considering a plurality of first services, and the security of the second service is enhanced.

Modification Example 1-8

The engine acquisition module 201 may acquire the second fraud detection engine based on the first fraud detection engine of, among a plurality of first services, the first services associated with the second service. The first services associated with the second service are first services in which the first fraud detection engine utilized as the source for the second fraud detection engine is applied. For example, it is assumed that the plurality of first services include a credit card electronic payment service, a points-based electronic payment service, an electronic payment service, and a travel reservation service. Of those services, when the two first services that are effective in fraud detection of an electronic money electronic payment service, which is the second service, are the credit card electronic payment service and the points-based electronic payment service, those two first services are associated with the second service. It is assumed that those associations are stored in advance in the data storage unit 200. The engine acquisition module 201 acquires the second fraud detection engine based on the first fraud detection engines of the first services associated with the second service without utilizing the first fraud detection engine of the first services that are not associated with the second service.

According to Modification Example 1-8, the second fraud detection engine is acquired based on the first fraud detection engine of, among the plurality of first services, the first services associated with the second service. As a result, the first fraud detection engine of the first services highly related to the second service can be utilized, and hence the security of the second service is enhanced.

Modification Example 1-9

For example, the result information may be used by the first fraud detection engine by combining the first embodiment and the second embodiment. The method itself of using the result information is as described in the second embodiment. In Modification Example 1-9, each function described in the second embodiment is implemented.

According to Modification Example 1-9, the result information is used by the first fraud detection engine. As a result, the security of the first service is enhanced.

3-2. Modification Examples of Second Embodiment

Figure 16:
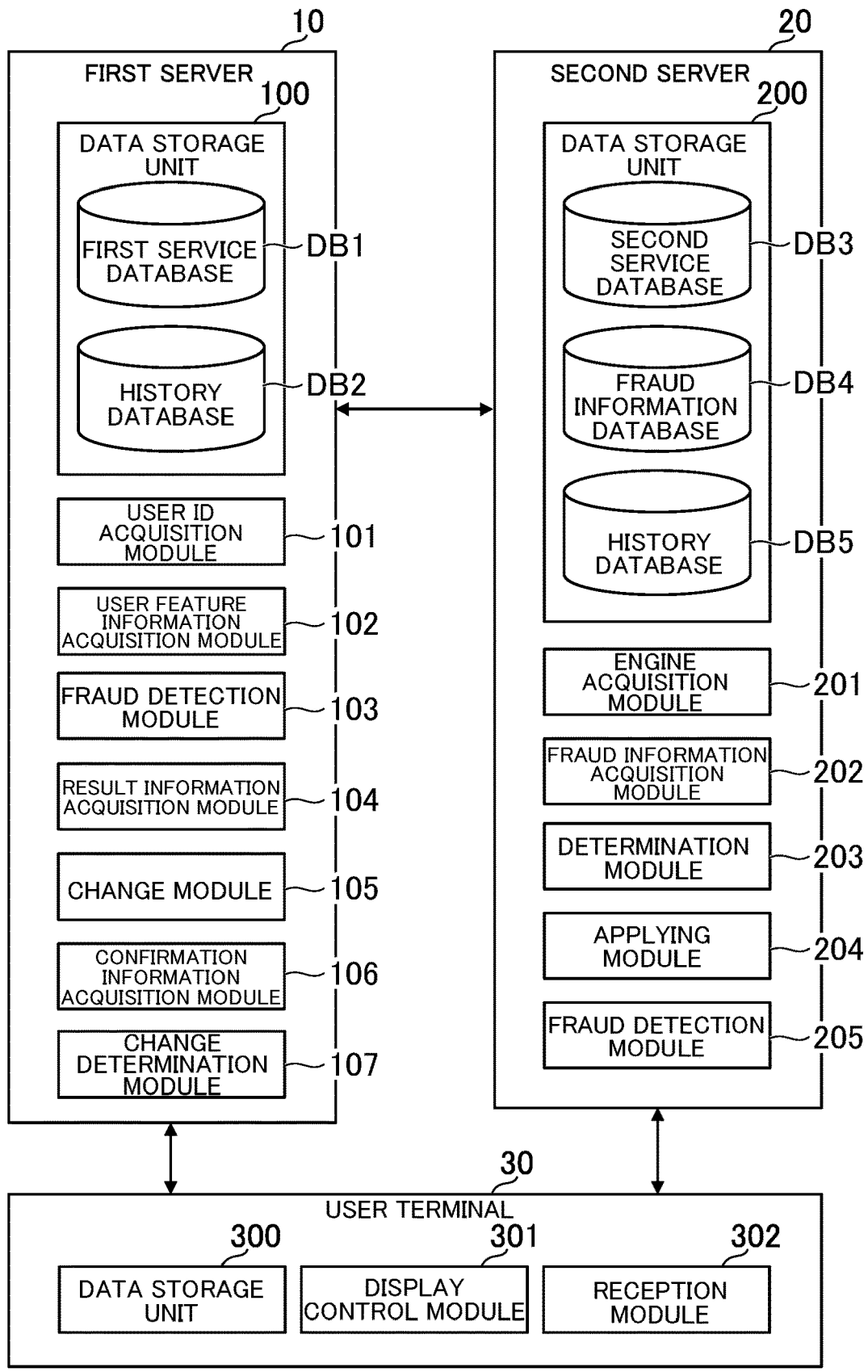
FIG. 16 is a functional block diagram of modification examples of the second embodiment.

Next, modification examples of the second embodiment are described. FIG. 16 is a functional block diagram of modification examples of the second embodiment. A confirmation information acquisition module 106 and a change determination module 107 are mainly implemented by the control unit 11.

Modification Example 2-1

For example, similarly to Modification Example 1-1, the fraud detection system S of the second embodiment may also be applied to an electronic payment service. The first server 10 uses the result information relating to an electronic money fraud in the second service for the credit card fraud detection in the first service. The fraud detection method to be performed when the fraud detection system S is applied to the electronic payment service is as described in Modification Example 1-1. The following modification examples also describe application examples in electronic payment services.

According to Modification Example 2-1, the security of the electronic payment service is enhanced.

Modification Example 2-2

For example, as described in the second embodiment, a plurality of second rules may be used in the second service. In this case, the result information indicates the result of fraud detection in the second service determined based on each of the plurality of second rules. That is, the result information indicates the result of fraud detection in which a plurality of second rules are comprehensively used. The result information may indicate the determination result of the presence or absence of a fraud for each second rule, or may indicate whether or not there is at least one second rule determining that there is a fraud.

The fraud detection module 103 detects a fraud in the first service based on the user feature information in the first service and the result information based on the plurality of second rules in the second service. For example, the fraud detection module 103 incorporates a plurality of pieces of result information in the second service into the user feature information, and detects a fraud in the first service. There is a difference from the second embodiment in that consideration is given to the plurality of pieces of result information as one feature amount, but the fraud detection itself in the first service is the same as in the second embodiment.

According to Modification Example 2-2, a fraud in the first service is detected based on the user feature information in the first service and the result information based on the plurality of second rules in the second service. The security of first the service is enhanced by comprehensively considering a plurality of second rules.

Modification Example 2-3

For example, in the second service, a second learning model for outputting a second score relating to a fraud in the second service may be used. The second learning model may be created by utilizing the first learning model like in Modification Example 1-3, or may be created without particularly utilizing the first learning model. In this case, the result information may be information relating to the second score output from the second learning model. The result information may indicate the score output by the second learning model, or may be information indicating whether or not the score is equal to or higher than a threshold value (that is, information indicating the presence or absence of a fraud).

The fraud detection module 103 detects a fraud in the first service based on the user feature information in the first service and the result information based on the second score in the second service. There is a difference from the second embodiment in that consideration is given to the second score as one feature amount, but the fraud detection itself in the first service is the same as in the second embodiment. Similarly to the result information based on the second rule described in the second embodiment, the result information based on the second score may be incorporated in the user feature information, or the result information may be used separately from the user feature information. For example, as one first rule, there may be a rule that determines that there is a fraud when the second score is equal to or higher than a threshold value, or that uses the second score as one feature amount to be input to the first learning model.

According to Modification Example 2-3, a fraud in the first service is detected based on the user feature information in the first service and the result information based on the second score in the second service. As a result, the security of the first service is enhanced by using the result of fraud detection in the second service for the first service as well.

Modification Example 2-4

For example, in the second service, a plurality of second learning models may be used. In this case, the result information is information relating to the second score output from each of the plurality of second learning models. That is, the result information indicates the result of fraud detection in which a plurality of second learning models are comprehensively used. The result information may indicate the second score of each individual second learning model, or may indicate whether or not there is at least one second learning model having a second score equal to or higher than a threshold value.

The fraud detection module 103 detects a fraud in the first service based on the user feature information in the first service and the result information based on the plurality of second scores in the second service. There is a difference from the second embodiment in that consideration is given to the plurality of second scores, but the fraud detection itself in the first service is the same as in the second embodiment.

According to Modification Example 2-4, a fraud in the first service is detected based on the user feature information in the first service and the result information based on the plurality of second scores in the second service. As a result, the security of the first service is enhanced by comprehensively considering a plurality of second learning models.

Modification Example 2-5

For example, when a plurality of second services exist, the result information acquisition module 104 may acquire a plurality of pieces of result information corresponding to the plurality of second services. For example, a certain second service is an electronic money electronic payment service provided by a certain company. Another second service is an electronic money electronic payment service provided by another company. There is a difference from the second embodiment in that a plurality of second services exist, but each of the pieces of the result information itself is the same as in the second embodiment. The functions described in the first embodiment and the second embodiment are implemented by the second server 20 of each second service.

The fraud detection module 103 detects a fraud in the first service based on the user feature information in the first service and the plurality of pieces of result information corresponding to the plurality of second services. There is a difference from the second embodiment in that consideration is given to each piece of result information in the plurality of second services, but the fraud detection itself in the first service is the same as in the second embodiment. The fraud detection module 103 incorporates the plurality of pieces of result information into the user feature information, and executes fraud detection by using the first fraud detection engine. For example, the fraud detection module 103 may determine that there is a fraud in the first service as well when there is at least one second service in which the result information indicates a fraud. The fraud detection module 103 may determine that there is a fraud in the first service when the number of second services in which the result information indicates a fraud is equal to or higher than a threshold value. Further, the fraud detection module 103 may input the number of second services in which the result information indicates a fraud as one feature amount into the first learning model, and acquire the output from the first learning model. In this case, it is assumed that the relationship between the number of second services and the presence or absence of a fraud has been learned in the first learning model.

According to Modification Example 2-5, a fraud in the first service is detected based on the user feature information in the first service and the plurality of pieces of result information corresponding to the plurality of second services. As a result, the security of the first service is enhanced by comprehensively considering the results of fraud detection in the plurality of second services.

Modification Example 2-6

For example, the result information acquisition module 104 acquires the result information corresponding to, among the plurality of second services, the second service associated the first service. The second service associated with the first service is the second service which refers to the result of fraud detection. For example, it is assumed that the plurality of second services include an electronic money electronic payment service, a points-based electronic payment service, an electronic payment service, and a travel reservation service. Of those services, when the two second services that are effective in fraud detection of a credit card electronic payment service, which is the first service, are the electronic money electronic payment service and the points-based electronic payment service, those two second services are associated with the first service. Those associations are stored in advance in the data storage unit 100. The result information acquisition module 104 does not acquire the result information corresponding to the second services that are not associated with the first service. There is a difference from the second embodiment in that the result information in the second services associated with the first service is acquired, but each of the pieces of the result information is the same as in the second embodiment.

The fraud detection module 103 detects a fraud in the first service based on the user feature information in the first service and the result information corresponding to the second services associated with the first service. There is a difference from the second embodiment in that consideration is given to each of the pieces of result information in the second services associated with the first service, but the fraud detection itself in the first service is the same as in the second embodiment. The fraud detection module 103 does not use the result information corresponding to the second services that are not associated with the first service in the fraud detection of the first service.

According to Modification Example 2-6, a fraud in the first service is detected based on the user feature information in the first service and the result information corresponding to the second services associated with the first service. As a result, fraud detection can be executed by using the result information corresponding to the second services which are highly related to the first service, and hence the security of the first service is enhanced.

Modification Example 2-7

For example, similarly to Modification Example 1-5, the second service may be a service in which the length of the period from the use of the second service to the confirmation of the presence or absence of a fraud is shorter than in the first service.

According to Modification Example 2-7, the second service is a service in which the length of the period from the use of the second service to the confirmation of the presence or absence of a fraud is shorter than in the first service. As a result, feedback can be provided to the first service on the latest fraud trends in the second service. For example, for the same reason as Modification Example 1-5, it becomes easier to respond to changes in frauds in the first service.

Modification Example 2-8

For example, the fraud detection system S may include the change module 105, the confirmation information acquisition module 106, and the change determination module 107. The confirmation information acquisition module 106 acquires confirmation information relating to the confirmation result of a fraud in the first service. A data set of the user feature information, result information, and status information stored in the history database DB2 is an example of the confirmation information. The confirmation information acquisition module 106 refers to the history database DB2 and acquires the confirmation information. The confirmation information acquisition module 106 acquires all or a part of the confirmation information stored in the history database DB2.

The change determination module 107 determines whether or not to change the first fraud detection engine for detecting a fraud in the first service based on the confirmation information in the first service and the result information in the second service. For example, the change determination module 107 determines whether or not a user confirmed to be a fraudulent user based on the confirmation information in the first service is also determined to be a fraudulent user in the second service. The change determination module 107 determines to change the first fraud detection engine when it is determined that a user confirmed to be a fraudulent user based on the confirmation information in the first service is also determined to be a fraudulent user in the second service. In this case, the trends of frauds in the first service and the trends of frauds in the second service are similar, and hence it is determined to use the result information of the second service in the first fraud detection engine.

The change determination module 107 may calculate a ratio of determinations of a fraud even in the second service among a predetermined number of pieces of confirmation information. The change determination module 107 may determine to change the first fraud detection engine when the ratio is equal to or higher than a threshold value. When it is determined that the first fraud detection engine is to be changed, the change module 105 executes processing for changing the first fraud detection engine based on the second fraud detection engine. The processing is as described in Modification Example 1-4. When it is not determined that the first fraud detection engine is to be changed, the change module 105 does not perform the processing.

According to Modification Example 2-8, when it is determined to change the first fraud detection engine based on the confirmation information in the first service and the result information in the second service, processing for changing the first fraud detection engine is executed based on the second fraud detection engine. As a result, the result of fraud detection in the second service is also used for fraud detection in the first service when it is effective to use the result of fraud detection in the second service, and the security of the first service is enhanced.

Modification Example 2-9

For example, the result information acquisition module 104 may acquire the result information relating to the result of fraud detection within a predetermined period from the present time. The period may have any length, and the length thereof may be, for example, several weeks or several months. The result information acquisition module 104 does not acquire the result information relating to the result of fraud detection executed before the predetermined period. It is assumed that the date and time of the execution of the fraud detection in the second service is stored in the history database DB5. Only the result information having a date and time of the execution of the fraud detection which is within the predetermined period is acquired.

The fraud detection module 103 detects a fraud by the user based on the user feature information in the first service and the result information in the second service within the predetermined period. There is a difference from the second embodiment in that the result information in the second service outside the predetermined period is not used in fraud detection, but the other points are the same as in the second embodiment.

According to Modification Example 2-9, the fraud detection module 103 detects a fraud by the user based on the user feature information in the first service and the result information in the second service within the predetermined period. As a result, feedback on the result of relatively new fraud detection can be provided, and the latest fraud trends can be responded to, and hence the security of the first service is enhanced.

Modification Example 2-10

For example, the first embodiment and the second embodiment may be combined, and the result information acquisition module 104 may acquire the result information relating to the result of fraud detection based on the second fraud detection engine applied by the applying module 204.

According to Modification Example 2-10, the result information relating to the result of fraud detection based on the second fraud detection engine is acquired. As a result, the security of the first service is enhanced while the creation of the second fraud detection engine is simplified.

3-3. Other Modification Examples

For example, the modification examples described above may be combined.

For example, any domain-specific language other than JSON can be used. The user feature information may be acquired by using a markup language. The data format of the user feature information may be various other formats. For example, the fraud detection system S can also be applied to fraud detection in services such as an electronic commerce service, an electronic ticket service, a financial service, or a communication service. For example, in the same manner as in the first embodiment, a first fraud detection engine in a first electronic commerce service provided by a certain company may be utilized as a second fraud detection engine in a second electronic commerce service provided by another company. Further, in the same manner as in the second embodiment, the result of fraud detection by the second fraud detection engine in the second electronic commerce service provided by the another company may be used in the fraud detection by the first fraud detection engine in the first electronic commerce service provided by the certain company.

Further, for example, the functions described as being implemented by the first server 10 may be implemented by another computer, or may be shared by a plurality of computers. The functions described as being implemented by the second server 20 may be implemented by another computer, or may be shared by a plurality of computers. For example, the data to be stored in the data storage units 100 and 200 may be stored in a database server.

The invention claimed is:

1. A fraud detection system, comprising a memory and at least one processor connected to the memory, wherein the at least one processor is configured to:
   acquire, based on a first fraud detection engine for detecting a fraud in a first service, a second fraud detection engine for detecting a fraud in a second service;
   acquire fraud information relating to a fraud that has actually occurred in the second service;
   determine, based on the fraud information, whether a fraud in the second service is detectable by the second fraud detection engine; and
   apply, when it is determined that a fraud in the second service is detectable by the second fraud detection engine, the second fraud detection engine to the second service.

2. The fraud detection system according to claim 1,
wherein the first fraud detection engine uses a first rule including a determination condition relating to a fraud in the first service,
wherein the second fraud detection engine uses a second rule which is based on the first rule,
wherein the at least one processor is configured to:
   determine whether a fraud in the second service is detectable by the second rule based on the fraud information, and
   apply the second rule to the second service when it is determined that a fraud in the second service is detectable by the second rule.

3. The fraud detection system according to claim 2,
wherein the first fraud detection engine uses a first learning model which outputs a first score relating to a fraud in the first service,
wherein the first rule includes a condition relating to the first score,
wherein the second fraud detection engine uses a second learning model which outputs a second score relating to a fraud in the second service, and
wherein the second rule includes a condition relating to the second score.

4. The fraud detection system according to claim 1,
wherein the first fraud detection engine uses a first learning model which outputs a first score relating to a fraud in the first service,
wherein the second fraud detection engine uses a second learning model which is based on the first learning model,
wherein the at least one processor is configured to:
   determine whether a fraud in the second service is detectable by the second learning model based on the fraud information, and
   apply the second learning model to the second service when it is determined that a fraud in the second service is detectable by the second learning model.

5. The fraud detection system according to claim 1,
wherein the at least one processor is configured to:
   acquire a plurality of pieces of the fraud information corresponding to a plurality of frauds that have actually occurred in the second service, and
   calculate a correct answer rate of the second fraud detection engine based on the plurality of pieces of the fraud information, and to determine whether a fraud in the second service is detectable by the second fraud detection engine based on the calculated correct answer rate.

6. The fraud detection system according to claim 1,
wherein the at least one processor is configured to:
   aquire, when the second fraud detection engine is applied to the second service, result information relating to a result of fraud detection in the second service; and
   execute processing for changing the first fraud detection engine based on the result information.

7. The fraud detection system according to claim 6,
wherein in the first service, when a first user of the first service uses the first service, a fraud by the first user is detected based on the first fraud detection engine,
wherein in the first service, presence or absence of a fraud by the first user is confirmed after the first service is used by the first user,
wherein in the second service, when a second user of the second service uses the second service, a fraud by the second user is detected based on the second fraud detection engine,
wherein in the second service, presence or absence of a fraud by the second user is confirmed after the second service is used by the second user, and
wherein the second service is a service in which a length of a period from use of the second service to confirmation of the presence or absence of a fraud is shorter than in the first service.

8. The fraud detection system according to claim 1,
wherein the first fraud detection engine uses a result of fraud detection in a third service, and wherein the at least one processor is configured to acquire, based on the first fraud detection engine, the second fraud detection engine in which the result of fraud detection in the third service is used.

9. The fraud detection system according to claim 1, wherein the at least one processor is configured to acquire the second fraud detection engine based on a plurality of the first fraud detection engines corresponding to a plurality of the first services.

10. The fraud detection system according to claim 1, wherein the at least one processor is configured to acquire the second fraud detection engine based on the first fraud detection engine of, among a plurality of the first services, the first service associated with the second service.

11. The fraud detection system according to claim 1, wherein the at least one processor is configured to acquire result information relating to a result of fraud detection in the second service when the second fraud detection engine is applied to the second service,
wherein the first fraud detection engine uses the result information.

12. The fraud detection system according to claim 1,
wherein the first fraud detection engine uses user feature information having a data format relating to a predetermined domain-specific language, and
wherein the at least one processor is configured to change a data name included in the user feature information used by the first fraud detection engine to a data name of the second service, and to acquire the second fraud detection engine which includes the changed data name and in which the user feature information having the data format relating to the predetermined domain-specific language is used.

13. The fraud detection system according to claim 1,
wherein the first service is a first electronic payment service, and
wherein the second service is a second electronic payment service different from the first electronic payment service.

14. A fraud detection method, comprising:
acquiring, based on a first fraud detection engine for detecting a fraud in a first service, a second fraud detection engine for detecting a fraud in a second service;
acquiring fraud information relating to a fraud that has actually occurred in the second service;
determining, based on the fraud information, whether a fraud in the second service is detectable by the second fraud detection engine; and
applying, when it is determined that a fraud in the second service is detectable by the second fraud detection engine, the second fraud detection engine to the second service.

15. A non-transitory computer-readable information storage medium for storing a program for causing a computer to:
acquire, based on a first fraud detection engine for detecting a fraud in a first service, a second fraud detection engine for detecting a fraud in a second service;
acquire fraud information sequist inogacquire fraud information relating to a fraud that has actually occurred in the second service;
determine, based on the fraud information, whether a fraud in the second service is detectable by the second fraud detection engine; and
apply, when it is determined that a fraud in the second service is detectable by the second fraud detection engine, the second fraud detection engine to the second service.

* * * * *